(12) United States Patent
Argoitia et al.

(10) Patent No.: US 12,164,128 B2
(45) Date of Patent: Dec. 10, 2024

(54) THIN FILM INTERFERENCE PIGMENTS WITH A COATING OF NANOPARTICLES

(71) Applicant: VIAVI SOLUTIONS INC., San Jose, CA (US)

(72) Inventors: Alberto Argoitia, Santa Rosa, CA (US); John Edward Book, Santa Rosa, CA (US); Jaroslaw Zieba, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 505 days.

(21) Appl. No.: 17/158,879

(22) Filed: Jan. 26, 2021

(65) Prior Publication Data

US 2021/0231849 A1    Jul. 29, 2021

Related U.S. Application Data

(60) Provisional application No. 62/966,391, filed on Jan. 27, 2020.

(51) Int. Cl.
*G02B 5/22* (2006.01)
*G02B 5/28* (2006.01)

(52) U.S. Cl.
CPC .............. *G02B 5/223* (2013.01); *G02B 5/28* (2013.01)

(58) Field of Classification Search
CPC . C09D 5/00; G02B 5/28; G02B 5/223; G02B 1/14; G02B 27/0172; G02B 5/3083; G02B 1/11; G02B 5/208; G02B 27/0101; G02B 1/10; G02B 5/20; G02B 6/12004; G02B 1/18; G02B 6/4204; G02B 6/4206; G02B 6/4215; G02B 5/00; G02B 6/29361; G02B 1/00; G02F 1/13363; G02F 1/133504; G02F 2202/36
See application file for complete search history.

(56) References Cited

U.S. PATENT DOCUMENTS

| 6,596,070 | B1 | 7/2003 | Schmidt et al. |
| 8,172,934 | B2 | 5/2012 | Hashizume |
| 2002/0192448 | A1 | 12/2002 | Schoen et al. |
| 2003/0060538 | A1 | 3/2003 | Norris et al. |
| 2003/0177949 | A1 | 9/2003 | Phillips et al. |
| 2003/0215641 | A1 | 11/2003 | Phillips et al. |

(Continued)

FOREIGN PATENT DOCUMENTS

| BR | 102012017356 | 3/2014 |
| CN | 1267686 A | 9/2000 |

(Continued)

OTHER PUBLICATIONS

Yan Yan et al., "Assembly of Layer-by-Layer Particles and Their Interactions with Biological Systems", ACS Publications, Aug. 22, 2013, 9 pages.

(Continued)

*Primary Examiner* — Hoan C Nguyen
(74) *Attorney, Agent, or Firm* — Mannava & Kang, P.C.

(57) ABSTRACT

An article including a thin film interference pigment; and a coating including a colored selectively absorbing nanoparticles is disclosed. The article can exhibit a change in hue, lightness, and/or chroma as compared to the thin film interference pigment alone. Methods of making the article are also disclosed.

19 Claims, 22 Drawing Sheets

(56) References Cited

U.S. PATENT DOCUMENTS

| | | | |
|---|---|---|---|
| 2004/0124398 A1* | 7/2004 | Kuntz | G03H 1/0256 |
| | | | 349/181 |
| 2005/0019575 A1 | 1/2005 | Jungnitz et al. | |
| 2007/0126694 A1* | 6/2007 | Moriyama | G09G 3/34 |
| | | | 345/107 |
| 2008/0070153 A1* | 3/2008 | Ioku | C09K 11/025 |
| | | | 430/327 |
| 2008/0128286 A1 | 6/2008 | Wu | |
| 2008/0292820 A1* | 11/2008 | Padiyath | G02B 5/208 |
| | | | 428/34 |
| 2008/0318012 A1 | 12/2008 | Domnick et al. | |
| 2010/0180796 A1 | 7/2010 | Kitamura et al. | |
| 2010/0297045 A1 | 11/2010 | Kaupp | |
| 2011/0223218 A1 | 9/2011 | Jones | |
| 2012/0050386 A1 | 3/2012 | Shimizu et al. | |
| 2013/0116106 A1* | 5/2013 | Servin | C03C 21/008 |
| | | | 977/890 |
| 2013/0200415 A1 | 8/2013 | Evans et al. | |
| 2013/0221837 A1 | 8/2013 | De Brouwer et al. | |
| 2015/0116856 A1* | 4/2015 | Lee | G02B 5/206 |
| | | | 977/932 |
| 2016/0002432 A1 | 1/2016 | Vo et al. | |
| 2016/0061417 A1* | 3/2016 | Kim | G02B 6/0026 |
| | | | 349/62 |
| 2017/0328539 A1* | 11/2017 | Huang | F21V 9/30 |
| 2017/0369709 A1* | 12/2017 | Seydel | C09C 1/0015 |
| 2018/0073159 A1 | 3/2018 | Curran et al. | |
| 2018/0084658 A1 | 3/2018 | Curran et al. | |
| 2018/0239070 A1* | 8/2018 | England | B44F 1/066 |
| 2019/0006541 A1* | 1/2019 | So | H01L 31/072 |
| 2019/0182996 A1* | 6/2019 | Kelkar | B29C 70/882 |
| 2020/0283637 A1 | 9/2020 | Book et al. | |
| 2020/0284947 A1* | 9/2020 | Argoitia | C09D 5/00 |

FOREIGN PATENT DOCUMENTS

| | | | | |
|---|---|---|---|---|
| CN | 1459034 | A | | 11/2003 |
| CN | 1542059 | A | | 11/2004 |
| CN | 1756805 | | | 4/2006 |
| CN | 101120059 | | | 2/2008 |
| CN | 101120059 | A | | 2/2008 |
| CN | 102504620 | A | | 6/2012 |
| CN | 103804963 | A | | 5/2014 |
| CN | 104205376 | A | | 12/2014 |
| CN | 105682451 | A | | 6/2016 |
| CN | 106526962 | A * | 3/2017 | ........... G02F 1/1336 |
| CN | 108219541 | A1 | | 6/2018 |
| CN | 110337468 | A | | 10/2019 |
| DE | 102008060228 | | | 6/2010 |
| EP | 0861299 | B1 | | 4/2000 |
| EP | 1254928 | | | 11/2002 |
| EP | 2361953 | | | 8/2011 |
| ES | 2341940 | | * | 6/2010 |
| JP | H04332766 | | | 11/1992 |
| JP | H07157689 | A1 | | 6/1995 |
| JP | H08199098 | A1 | | 8/1996 |
| JP | H0959532 | A | | 3/1997 |
| JP | 2001152049 | A1 | | 6/2001 |
| JP | 2006521463 | A | * | 9/2006 |
| JP | 2006299051 | | | 11/2006 |
| JP | 2007518841 | A1 | | 4/2007 |
| JP | 2009511725 | A1 | | 3/2009 |
| JP | 2009221140 | A1 | | 10/2009 |
| JP | 2013518953 | A | | 5/2013 |
| JP | 2017149946 | A | | 8/2017 |
| KR | 20180066820 | | | 6/2018 |
| RU | 2015143539 | A * | 4/2017 | .............. B41M 1/02 |
| WO | 2004/050350 | | | 6/2004 |
| WO | 2007094253 | A1 | | 8/2007 |
| WO | 2015/052319 | | | 4/2015 |
| WO | 2017/041085 | | | 3/2017 |
| WO | 2018199182 | A1 | | 11/2018 |

OTHER PUBLICATIONS

R.K. Iler "Multilayers of Colloidal Particles", Journal of Colloid and Interface Science 21, year 1966, pp. 569-594.

Marc Michel et al., "Review article: Deposition Mechanisms in Layer-by-Layer or Step-by-Step Deposition Methods: From Elastic and Impermeable Films to Soft Membranes with Ion Exchange Properties", ISRN Materials Science, vol. 2012, Article ID 701695, 13 pages.

Science Direct Topics, "Perylene—an overview", Downloaded from the Internet on Nov. 29, 2023, 18 pages. (https://www.sciencedirect.com/topics/chemistry/perylene#:~:text=Perylene%201%20is%20a%20polycyclic,high%2Dboiling%20mineral%20oil%20fractions.).

Wikipedia, "Perinone", downloaded from the Internet on Nov. 29, 2023, 2 pages. (https://en.wikipedia.org/wiki/Perinone).

Wikipedia, "Quinacridone", downloaded from the Internet on Nov. 29, 2023, 4 pages. (https://en.wikipedia.org/wiki/Quinacridone).

* cited by examiner

THIN FILM INTERFERENCE PIGMENTS WITH A COATING OF NANOPARTICLES

RELATED APPLICATIONS

This application claims the benefit of priority to U.S. Provisional Application No. 62/966,391, filed Jan. 27, 2020, the entire disclosure of which is hereby incorporated by reference.

FIELD OF THE INVENTION

The present disclosure generally relates to an article including a thin film interference pigment; and a coating including a colored selectively absorbing nanoparticle. Methods of making the article are also disclosed.

BACKGROUND OF THE INVENTION

Fabry-Perot multilayer structures exhibit a color primarily because of the thickness of a dielectric layer present in the structure. The thickness of the dielectric layer therefore limits the pallet of colors that can be produced.

One way to manipulate the color produced can be to add a colorant into an ink or paint vehicle that includes the Fabry-Perot multilayer structure. However, a blend of a colorant and a Fabry-Perot multilayer structure can be difficult to formulate to obtain the desired final color due to variables with the colorant, such as colorant concentration, colorant size, colorant distribution. Additionally, a blend of a colorant and a Fabry-Perot multilayer structure can be difficult to reproduce batch-to-batch.

Another problem with a blend is the issue of light scattering. In particular, a large quantity of colorant particles distributed in a large volume to create the ink or paint will significantly increase light scattering so that the scattering effects are interdependent. Additionally, colorant absorbing pigments typically used in blends have large particle sizes, which can also increase light scattering because each large particle can independently scatter light.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

In an aspect, there is disclosed an article including a thin film interference pigment; and a coating including a colored selectively absorbing nanoparticle on the thin film interference pigment.

In another aspect, there is disclosed a method of making an article including providing a thin film interference pigment; and coating the thin film interference pigment with a colored selectively absorbing nanoparticle.

In an aspect, there is disclosed an article including a thin film interference foil; and a coating including a colored selectively absorbing nanoparticle on the thin film interference pigment.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein are articles; and a method of making and using articles.

Figure 22:
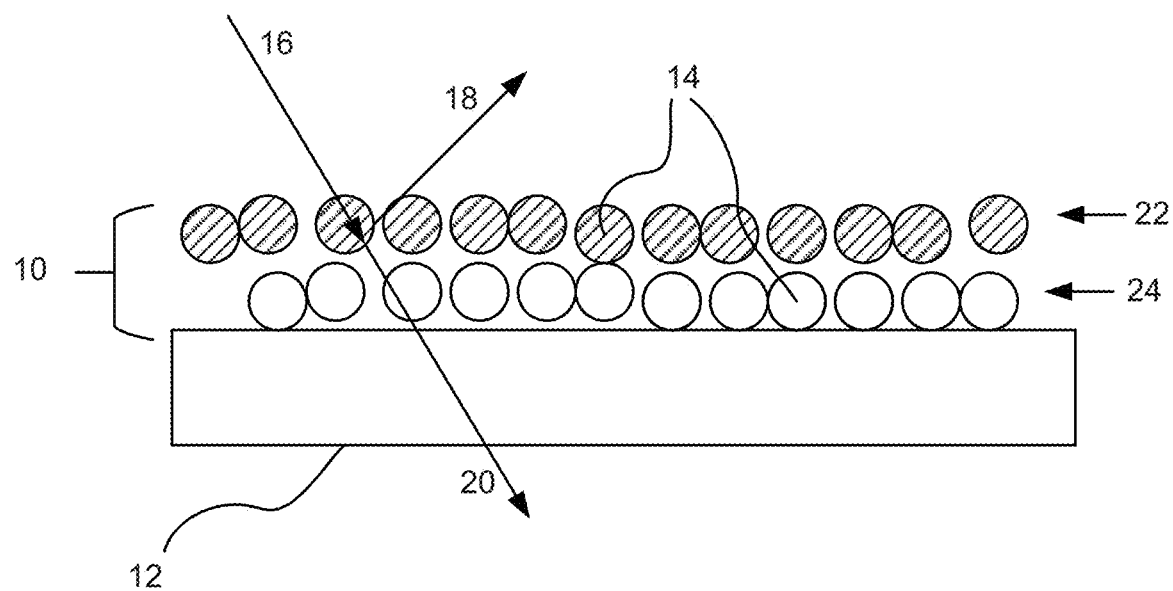
FIG. 22 is a cross-section of an article illustrating the reflected and transmitted color with discrete layer of nanoparticles.
Figure 23:
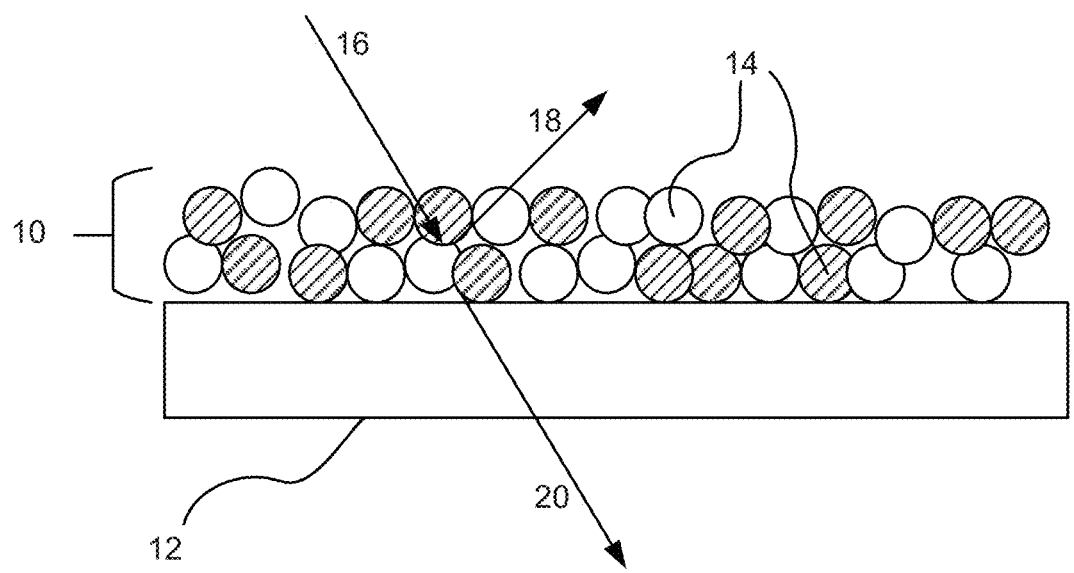
FIG. 23 is a cross-section of an article illustrating the reflected and transmitted color with a coating of blended nanoparticles.

The present disclosure describes articles including a pigment 12, such as thin film interference pigment, and a coating 10 including a colored selectively absorbing nanoparticle 14, as shown in FIGS. 22 and 23. The coating 10 can manipulate the reflectance of the pigment 12 to improve chromaticity and/or create a color (at both normal and angle) not possible with the pigment 12 alone. The method of making the disclosed articles is cost effective and can provide a high throughput of pigments.

In an aspect, the pigment 12 can include a core material chosen from reflective opaque materials, semi-transparent materials, and transparent materials depending upon the desired optical property of the resultant pigment.

The pigment 12 can be a metal, non-metal, or metal alloy. In one example, the materials for the pigment 12 can include any materials that have reflective characteristics in the desired spectral range. For example, any material with a reflectance ranging from 5% to 100% in the desired spectral range. An example of a reflective material can be aluminum, which has good reflectance characteristics, is inexpensive, and is easy to form into or deposit as a thin layer. Non-limiting examples of reflective opaque material for use in the pigment 12 include aluminum, copper, silver, gold, platinum, palladium, nickel, cobalt, niobium, chromium, tin, iron, and combinations or alloys of these or other metals can be used as the pigment. In an aspect, the material for the pigment 12 can be a white or light colored metal. In other examples, the pigment 12 can include, but is not limited to, the transition and lanthanide metals and combinations thereof; as well as metal carbides, metal oxides, metal nitrides, metal sulfides, a combination thereof, or mixtures of metals and one or more of these materials. In an aspect, the pigment 12 may include a transparent or semi-transparent material chosen from glass, silica, titania, alumina, natural mica, synthetic mica, and bismuth oxychloride. In another aspect, the pigment 12 can include a metalloid material chosen from silicon, germanium, and molybdenum.

In another aspect, the pigment 12, such as a thin film interference pigment, can be any special effect pigment, such as a pigment including a reflector layer, a dielectric layer, and an absorber layer, and optionally a magnetic layer. Non-limiting examples of commercially available pigments include SPECTRAFLAIR®, CHROMAFLAIR®, Optical Variable Pigment (OVP), SecureShift, and Optical Variable Magnetic Pigment (OVMP), available from Viavi Solutions, Inc. (San Jose, CA).

The pigment 12, such as a thin film interference pigment, can be coated with a colored selectively absorbing nanoparticle 14. The nanoparticles 14 can selectively absorb any undesired high or low angle colors from a reflectance spectrum of the pigment 12, such as the thin film interference pigment. The undesired colors can be located along a color travel path of the thin film interference pigment 12 and can be located between different desired colors. Additionally, the nanoparticles 14 can modify a desired color of the article at different viewing angles. Finally, the nanoparticles 14 can change a color shift of the pigment 12, such as a thin film interference pigment, so that the color shift of the article is from a low to high wavelength.

The selectively absorbing nanoparticles 14 can be colored and/or can act as a color filter. The selectively absorbing nanoparticles 14 can be nanoparticle chosen from a pigment, a dye, a metallic nanoparticle, a metal oxide, a metal carbide, a metal sulfide, a metal nitride, and combinations thereof. Non-limiting examples of selectively absorbing nanoparticles 14 include titanium dioxide, zinc oxide, silicon dioxide, aluminum oxide, iron (II, III) oxide, zirconium dioxide, indium tin oxide, $CeO_2$, zinc nitride, gold, silver, carbon black, iron oxide, mixed metal oxides, zinc sulfide, iron sulfide, copper sulfide, perylene, perinone, quinacridone, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindoline, isoindolinone, pyranthrone, isoviolanthrone, miyoshi methane, triarylmethane, and mixtures thereof. In an aspect, the selectively absorbing nanoparticle 14 can be charged.

In particular, the coating 10 can include the selectively absorbing nanoparticles 14 in a suitable matrix. The coating 10 can include a plurality of colored selectively absorbing nanoparticles 14. In an aspect, the coating 10 can also include uncolored selectively absorbing nanoparticles. In an aspect, the coating 10 can also include uncolored organic polymeric nanoparticles. In an aspect, the coating 10 can include a plurality of selectively absorbing nanoparticles 14 in which all of the selectively absorbing nanoparticles 14 are a same color.

The coating 10 can be multiple layers including two or more layers in which each layer has a colored selectively absorbing nanoparticle 14. For example, a layer can include cyan pigment nanoparticles 14, or a layer can include yellow pigment nanoparticles 14. The multiple layers can include two or more layers of a first color of selectively absorbing nanoparticles 14, and two or more layers of a second color of selectively absorbing nanoparticles 14, wherein the first color is different from the second color. For example, a first layer can include cyan pigment nanoparticles 14, and a second layer can include yellow pigment nanoparticles 14.

The coating 10 can include two or more layers of colored selectively absorbing nanoparticles 14, such as a first layer with a first portion of colored selectively absorbing nanoparticles 14, and a second layer with a second portion of colored selectively absorbing nanoparticles 14. For example, a first layer can include 30 weight % of cyan pigment nanoparticles and a second layer can include 40 weight % cyan pigment nanoparticles 14

In another aspect, the coating 10 can include a plurality of selectively absorbing nanoparticles of different colors. In an aspect, the coating 10 can be a layer including a blend of two or more different colored selectively absorbing nanoparticles 14. The blend can be equal portions of each of the two or more different colored selectively absorbing nanoparticles 14. As an example, the blend can include a 50/50 split of cyan pigment nanoparticles 14 and yellow pigment nanoparticles 14. In another aspect, the blend can be different portions of each of the two or more different colored selectively absorbing nanoparticles 14. For example, the blend can be an 80/20 split of cyan pigment nanoparticles 14 and yellow pigment nanoparticles 14. Any ratio of the two or more different colored selectively absorbing nanoparticles 14 can be used in the coating 10.

The coating 10 can be multiple layers in which each layer includes a blend of two or more different colored selectively absorbing nanoparticles 14. For example, the coating 10 can include a first layer with a blend of cyan/yellow pigment nanoparticles 14 and a second layer with a blend of magenta/yellow pigment nanoparticles 14.

The selectively absorbing nanoparticles 14 present in the coating 10 can be the same or different, such as in terms of the material for the nanoparticle 14, the average particle size of the nanoparticles 14, the concentration (percent volume) of nanoparticles 14 in the coating 10, etc. In an aspect, the coating 10 includes a plurality of selectively absorbing nanoparticles 14 that are different one from another. A skilled person can adjust the above-described variables to achieve an article with the desired resultant color, including the desired lightness and chroma. For example, a skilled person can select a weakly colored nanoparticle 14, but with a large average particle size, in a high concentration in the coating 10 to achieve a resultant color in the article with high chroma. Additionally, and or alternatively, a skilled person can select a highly colored nanoparticle 14, but with a small average particle size, in a medium concentration in the coating 10 to still achieve a resultant color in the article with high chroma.

The selectively absorbing nanoparticles 14 can have an average particle size ranging from less than about 300 nm; for example, from about 2 nm to about 100 nm; for example, from about 4 nm to about 95 nm; and as a further example, from about 6 nm to about 90 nm. The average particle size can have an effect on the resultant chroma of the article. For example, a large average particle size can increase the intensity and/or chroma of the resultant color of the article because the article will achieve color saturation faster, i.e., with less material.

The concentration of the selectively absorbing nanoparticles 14 can also affect the intensity and/or chroma of the resultant color of the article. The selectively absorbing nanoparticles 14 can be present in the coating 10 in an amount greater than about 40% by volume, for example greater than about 65% by volume, and as a further example greater than about 70% by volume. For example, a coating 10 with greater than about 70% by volume of selectively absorbing nanoparticles 14 will have a higher color saturation as compared to a coating 10 with about 65% by volume of selectively absorbing nanoparticles 14. As a further example, an intensity of the color of the article is increased by a high concentration of the selectively absorbing nanoparticle 14 in the coating 10.

The coating 10 of selectively absorbing nanoparticles 14 can be a single layer or multiple layers. In an aspect, the disclosed article can include a thin film interference pigment 12 with a coating 10 with multiple layers of selectively absorbing nanoparticles 14, in which each layer of the multiple layers includes a plurality of selectively absorbing nanoparticles 14 that are different one from another. The use of multiple layers can also increase the color saturation of the article.

The coating 10 of selectively absorbing nanoparticles 14 can be continuous or discontinuous on a surface of the pigment 12, such as a thin film interference pigment. In an aspect, the coating 10 is continuous on the surface of the pigment 12. In another aspect, the coating 10 is discontinuous on the surface and has a low impact on light scattering. The coating 10 of selectively absorbing nanoparticles 14 can be present on greater than about 90% of a surface of the pigment 12; for example, greater than about 95% of the pigment 12; and as a further example, can be present on all surfaces (100% continuous/encapsulating) the pigment 12. In an aspect, the coating 10 of selectively absorbing nanoparticles 14 can be discontinuous, such as in the form of spots, lines, etc. An intensity of a color of the article can be increased by a fully encapsulating coating.

In an aspect, the coating 10 can, but should not, negatively impact a hiding property of the thin film interference pigment 12.

The selectively absorbing nanoparticles 14 can have other properties besides, or in addition to, ultraviolet (UV) light absorption. In an aspect, the selectively absorbing nanoparticles 14 can have a property chosen from fluorescence, phosphorescence, thermochromic, photochromic, and infrared (IR) fluorescence (anti-stokes).

UV light exposure can degrade nanoparticles. In an aspect, the coating 10 can include other particles that can protect the nanoparticles, for example, particles that absorb ultraviolet light and/or decrease photocatalytic activity inherent in some nanoparticles. The coating 10 can include other particles, such as titanium dioxide, zinc oxide, silicon dioxide, $Al_2O_3$, and $CeO_2$.

The nanoparticles can also exhibit metallic resonance plasmons effects. These effects can be enhanced by local fields so that the nanoparticles can have different spectral responses depending upon the light source, e.g., polarized or unpolarized light.

In an aspect, instead of a thin film interference pigment, the article can include a thin film interference foil; and a coating 10 of selectively absorbing nanoparticles 14 on the thin film interference foil. The article can be used as a thread in security applications. The coating 10 of selectively absorbing nanoparticles 14 can be as described herein. The article can include a substrate (PET) and can have the following structure:

PET/absorber/dielectric/reflector/coating 10 of selectively absorbing nanoparticle 14. In another aspect, the article can have the following structure:

PET/reflector/dielectric/absorber/coating of selectively absorbing nanoparticle.

A method of making the disclosed article can be performed using techniques, such as layer-by-layer technology. In an aspect, the method can include providing a post-processed thin film interference pigment. In another aspect, the method can include making a thin film interference pigment 12 and 10 with selectively absorbing nanoparticles.

A method of making the article disclosed herein can include providing a pigment 12, such as a thin film interference pigment; and coating 10 the thin film interference pigment with a colored selectively absorbing nanoparticle 14. The coating step can include providing a layer of a first charged nanoparticle 14 to the pigment 12; rinsing; providing a layer of a second charged nanoparticle 14 to the layer of the first charged nanoparticle 14, wherein the second charged nanoparticle 14 material is oppositely charged from the first charged nanoparticle material 14; and rinsing; wherein a coating 10 of selectively absorbing nanoparticles 14 is formed on a surface of the pigment 12. The steps of providing the layer of the first charged nanoparticle 14 and providing the layer of the second charged nanoparticle 14 can be repeated so that the coating 10 of selectively absorbing nanoparticles 14 is a multilayer coating 10.

The coating step can also include providing a layer of a first charged polymer to the pigment; rinsing; providing a layer of a first charged nanoparticle to the layer of the first charged polymer, wherein the first charged nanoparticle material is oppositely charged from the first charged polymeric material; and rinsing; wherein a coating 10 of selectively absorbing nanoparticles is formed. The steps of providing the layer of the first charged polymer and providing the layer of the first charged nanoparticle can be repeated so that the coating 10 of selectively absorbing nanoparticles is a multilayer coating 10.

The coating step can also include providing a final step with a charged polymer to the last coating 10 including charged selectively absorbing nanoparticle of the multilayer to provide for specific surface functionalization of the pigments.

The coating 10 of selectively absorbing nanoparticles 14 can fully encapsulate the pigment, such as the thin film interference pigment 12. The coating 10 is continuous on all surfaces of the pigment. Alternatively, the coating 10 of selectively absorbing nanoparticles 14 can encapsulate a portion of the pigment, such as the thin film interference pigment 12. The coating 10 can be continuous, and yet only encapsulate a portion of the pigment. The coating 10 can be discontinuous and encapsulate a portion of the pigment.

In an alternative method, the multilayer coating 10 can be created by alternating a layer of selectively absorbing nanoparticles and a layer of charged polymers (polyelectrolytes) or other molecules presenting interacting binding sites. So, a layer sequence comprises one or more materials having ionic groups of opposite charges. A simple layer sequence can be ABAB(AB)n, wherein n is an integer greater than 1. Notice that even shown as different materials A and B, these two materials could be the same material where the surface was rendered of opposite charges. The multilayer coating 10 could also use more materials. The multilayer coating 10 can include any materials and is only dependent upon the selection of the charges for each material.

The steps of providing a layer of first charged or second charged nanoparticles can use any technologies, such as filtration, sedimentation or centrifugation processes. In these processes, the nanoparticles are allowed to sediment or are filtered or centrifuged (faster processes) after the successive application of the first charged nanoparticle (A), rinsing stage, and resuspension/application of the second charged nanoparticle (B). Other process may include successive filtration using systems such as filter reactors, trickle-bed reactors, up-flow reactors, membrane reactors, and the equivalent. In another method, the pigment could be forced to transit (i.e. by sprayed) to areas containing atomized solutions of first charged nanoparticle (A), rinsing media, and second charged nanoparticle (B). Alternative deposition techniques include wet coating method including dip coating, spin coating, flow coating, spray coating, roll coating, gravure coating, and a similar method.

The steps of rinsing can be performed with any solvent, such as a polar solvent. Non-limiting examples of solvents can include water; acetates, such as ethyl acetate, propyl acetate, and butyl acetate; acetone; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof.

The method can further include a step of providing a layer to a surface of the pigment prior to providing a coating 10 of nanoparticles. The layer is located between the thin film interference pigment and the coating 10 to protect the thin film interference pigment or to provide a receptive surface for the coating 10. In an aspect of the invention, the distribution of the receptive layer on the surface of the pigment can allow for controlling the distribution of the coating 10 including the selectively absorbing nanoparticles. In particular, the layer can inhibit oxidation of the pigment when it is exposed to the coating 10 of selectively absorbing nanoparticles. The layer can include a sol-gel layer of materials such as silica, titania, alumina, zirconia, ceria, or combinations to mention few or a polymeric layer, for example. In an aspect, the method of making an article can include providing a pigment; providing a layer of a first charged nanoparticle to the pigment; rinsing; providing a layer of charged polymer (polyelectrolytes) or other molecules presenting interacting binding sites; rinsing; providing a layer of a second charged nanoparticle to the layer of the charged polymer (polyelectrolytes) or other molecules presenting interacting binding sites; and rinsing.

The method can further include a step of providing a second protecting layer to a top-most layer of the coating 10 of nanoparticles. The second protecting layer can include a layer of charged polymers (polyelectrolytes) or other organic molecules presenting interacting binding sites or a sol-gel layer. In an aspect, a second protecting layer of charged polymers (polyelectrolytes) or other organic molecules presenting interacting binding sites can provide a functionalized outer surface with tunable properties such as hydrophilicity, hydrophobicity, lipophilicity, permeability, hardness, stiffness, to mention a few to the pigment.

In an additional aspect, the method can further include encapsulating the selectively absorbing nanoparticles, which are coated on the pigment, with a protectant layer.

The method can include making a thin film interference pigment on a substrate with a release layer. The release layer can be compatible with liquid coating processes and vacuum deposition.

The method can include several post-processing steps, such as stripping the article from the release layer/substrate, grinding, etc.

EXAMPLES

Figure 1:
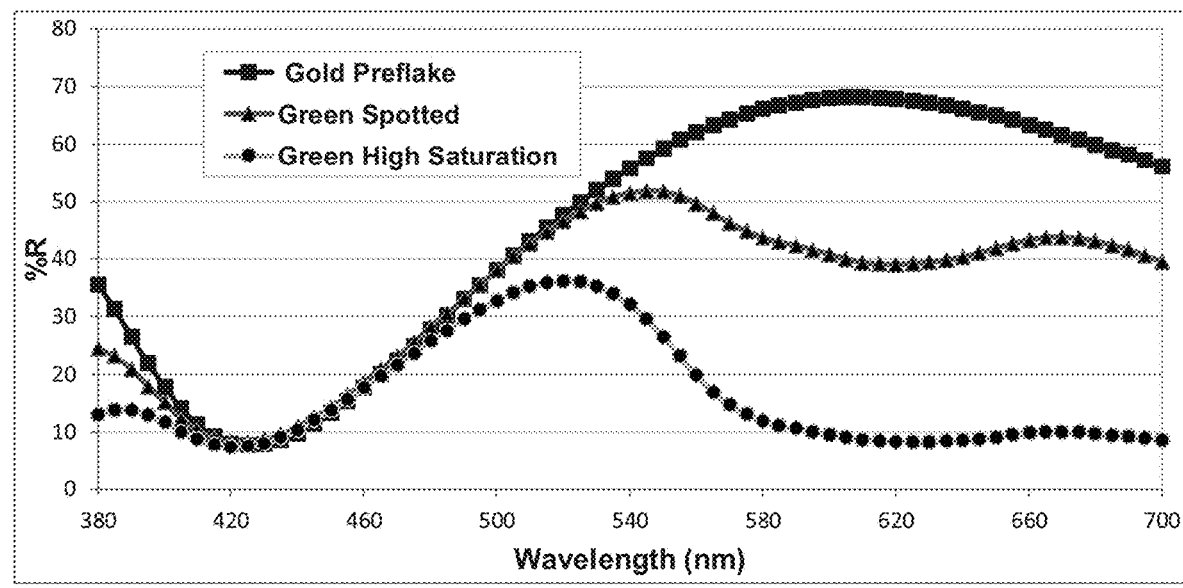
FIG. 1 illustrates the percent reflectance of the gold pre-flake alone, green spotted, and green high saturation.
Figure 2:
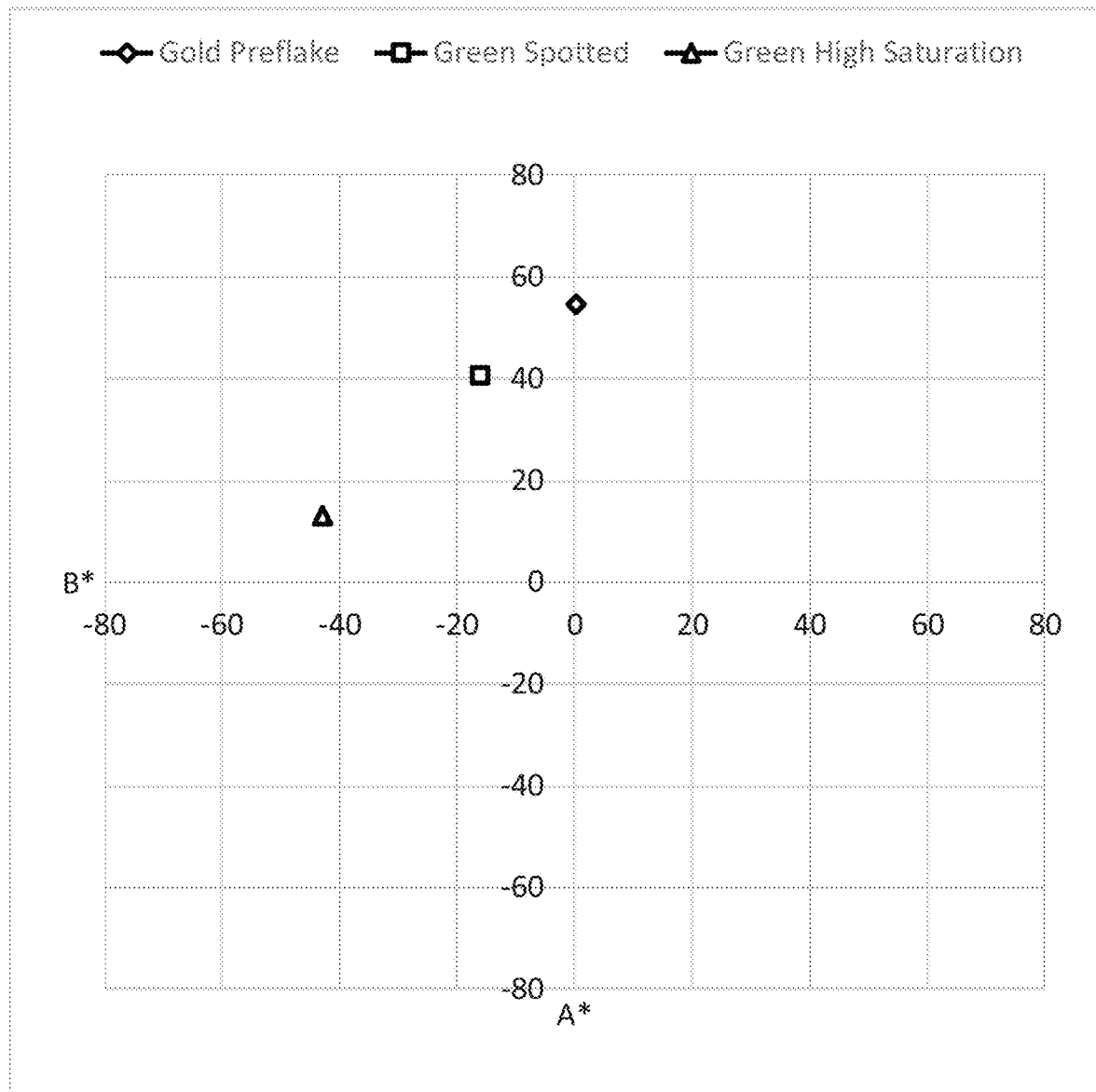
FIG. 2 illustrates the hue of the samples in FIG. 1 using an a*, b* graph.

Example 1—A Gold thin film interference pigment 12 (gold preflake) was coated to varying degrees to produce different levels of intensity depending on the saturation/intensity by the coated selectively absorbing nanoparticle 14. The data is shown in FIGS. 1 and 2. The thin film interference pigment 12 was based on the following structure: Cr/ZnS/Al/ZnS/Cr. The gold thin film interference pigment 12 was fully encapsulated with a continuous coating 10 of selectively absorbing nanoparticles 14, i.e. a cyan pigment, in a high concentration (green high saturation). The same gold thin film interference pigment 12 was fully encapsulated with a continuous coating 10 of selectively absorbing nanoparticles 14, i.e. the same cyan pigment, but with a lower concentration of the selectively absorbing nanoparticles 14 in the coating, e.g. 65% by volume (not shown). The gold thin film interference pigment 12 was partially encapsulated with a discontinuous coating 10 of selectively absorbing nanoparticles 14, i.e. the same cyan pigment, but with a larger average particle size (not shown) as compared to the other two samples with a continuous coating. The green high saturation and the green spotted articles each exhibited a green color in reflection, but with different hues and varying degrees of intensity and chroma. The green high saturation had a higher intensity/color saturation as compared to the green spotted. The green spotted had a less saturated color, i.e., it was more pastel, because the total reflected light also came from areas of the thin film interference pigment 12 that were not filtered by the coating 10. An intensity of a color of the article was increased by a high concentration of the selectively absorbing nanoparticle 14 in the coating 10. Additionally, an intensity of a color of the article was increased by the addition of layers to the coating 10.

The optical characterization of the three Samples was done using paint draw downs on Leneta cards and analyzed under diffuse illumination with a DC650 Photospectrometer. Table 1 shows the Lightness (L*), a*, b*, chroma (c*), and hue of the articles. As can be seen, the lightness (L*) decreased and the hue increased as the coating 10 of the selectively absorbing nanoparticles 14 was increased.

TABLE 1

Optical Properties measured with DC650 Photospectrometer.

| Sample Name | Gold Preflake | Green Spotted | Green High Saturation |
|---|---|---|---|
| L* | 78.98 | 71.82 | 54.25 |
| a* | 0.19 | −15.99 | −42.84 |
| b* | 54.56 | 40.65 | 13.20 |
| c* | 54.56 | 43.68 | 44.82 |
| h | 89.8 | 111.48 | 162.88 |

FIG. 1 illustrates the percent reflectance of the gold thin film interference pigment 12 (gold pre-flake) alone, green spotted, and green high saturation. FIG. 2 illustrates the hue of the samples in FIG. 1 using an a*, b* graph. Looking at FIGS. 1 and 2, one can see the evolution of the color as the concentration and/or encapsulation of the coating 10 of the selectively absorbing nanoparticles 14 (cyan pigment) increases. As reported in Table 1 and shown in FIG. 2, the green high saturation article was green with a higher hue value of 162.88, followed by the green spotted article, which visually looked like a yellow-green color with a hue of 111.48, and the gold pre-flake was a gold color with a hue of 89.8 (does not include a coating 10 of selectively absorbing nanoparticles 14, e.g., cyan pigment).

Example 2—the Colors at Normal and High Angle(60°) of commercially available pigments with a coating 10 of selectively absorbing nanoparticles 14 (cyan, magenta, yellow, and green) were used to determine the expected dominant spectral color. However, depending upon variables, such as those discussed herein including intensity, absorbing power, and concentration of nanoparticles, the color shift trajectory of the coated thin film interference pigment 12 can change. Additionally, optical properties of a selectively absorbing nanoparticle 14 can have small spectral changes that modify a visual color observed. For example, a number of cyan pigments show band tails in the visible region that produce a yellow component to color. For this reason, the spectral absorption of the selectively absorbing nanoparticles 14 can be used to better predict the final color travel of the article (thin film interference pigment 12 coated with selectively absorbing nanoparticle 14).

Figure 3:
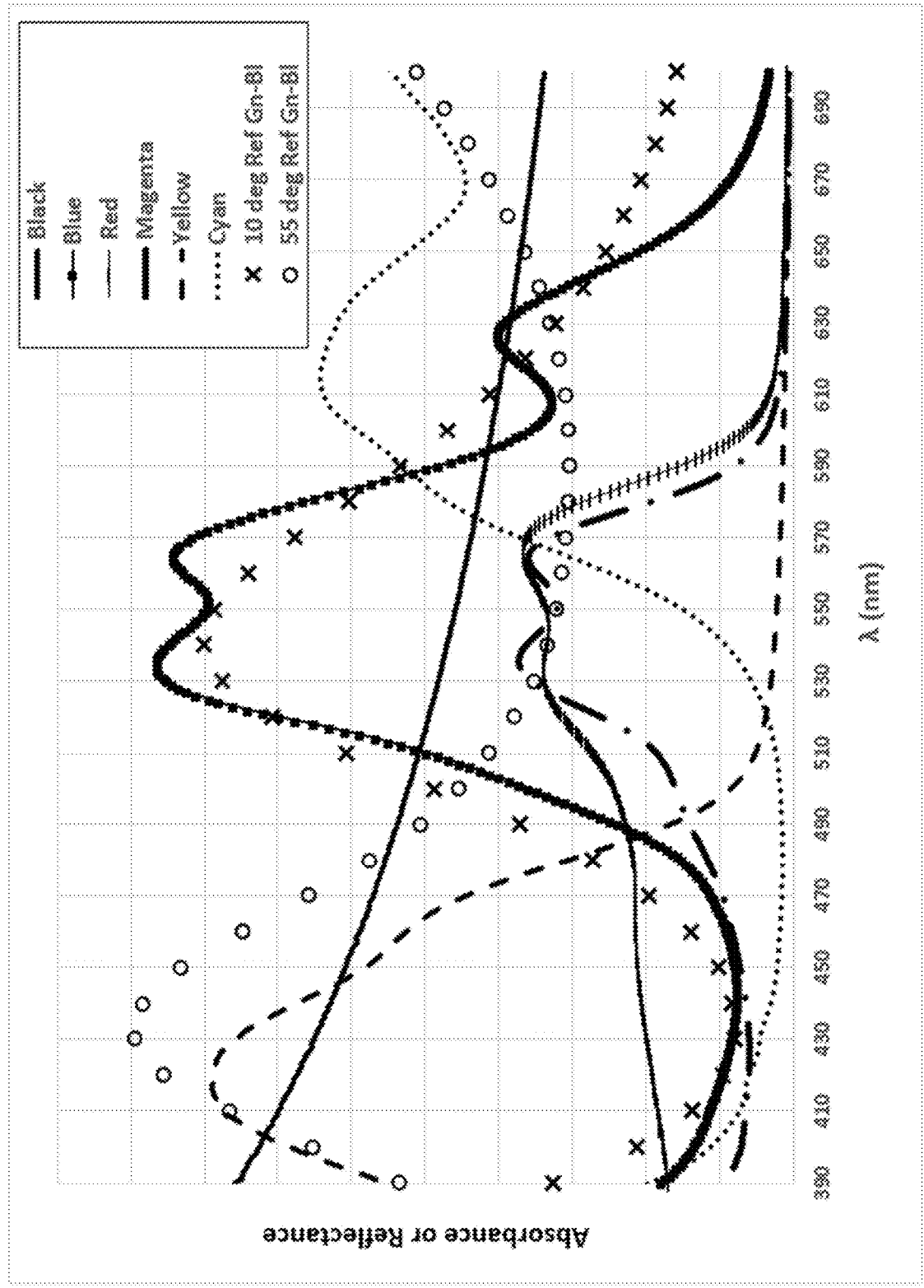
FIG. 3 is a reflectance plot for a thin film interference pigment at low and high angle, and the characteristic absorbance of various selectively absorbing nanoparticles.
Figure 4:
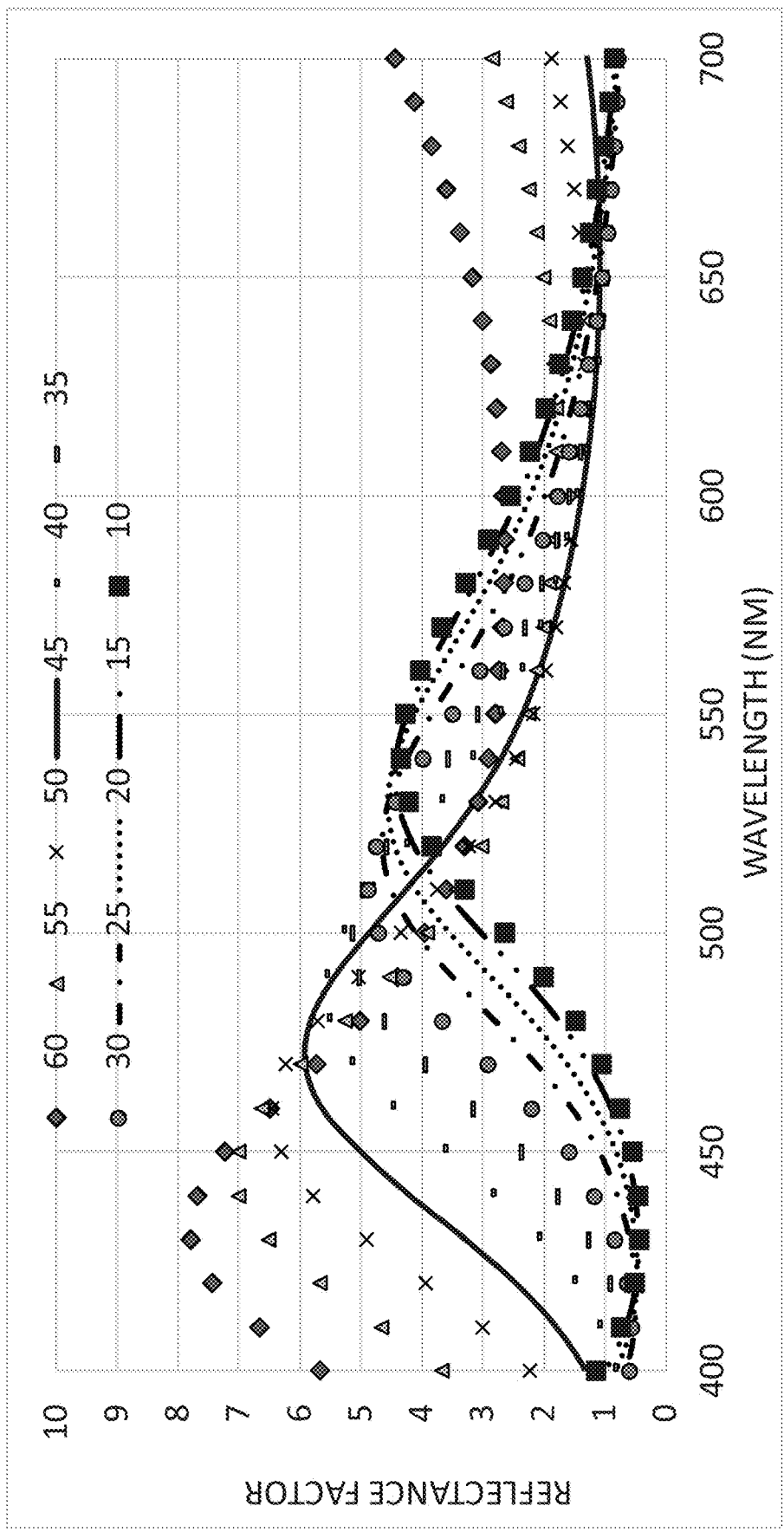
FIG. 4 is a reflectance plot for the thin film interference pigment of FIG. 3 for various angles from low to high angle.

The new color travel as a function of the illumination and viewing angles can be predicted based on the reflectance versus wavelength plots of the thin film interference pigment 12 and on the wavelength and intensity absorbed by the coating 10 of the selectively absorbing nanoparticle 14. FIG. 3 is graph illustrating the reflectance plots of a thin film interference pigment 12 at low (10 degrees) and high angle (55 degrees) showing a color travel from green to blue. FIG. 3 also illustrates the absorption of several other selectively absorbing nanoparticles 14: cyan, yellow, magenta, red, blue, and black. This figure shows how, for example, a coating 10 of selectively absorbing nanoparticles 14, e.g., a yellow pigment, which is a blue light absorber, could partially or totally eliminate the blue reflectance at high angle making the article shift to a very dark or black appearance. FIG. 4 illustrates the reflectance curves for the thin film interference pigment 12 when viewed at normal to high angle. The coating 10 of a selectively absorbing nanoparticle 14 (i.e., yellow pigment) can not only block the reflectance for angles higher than 45 degrees, but can also affect the color at the other angles. It was also determined that the design of the thin film interference pigment 12 can be changed to change a peak position of color at different angles so that the angles at which some reflected peaks will be blocked.

Example 3—Color travel from special effect pigments based on thin film interference is from high to low wavelength as the viewing angle changes from normal (low) to high. Table 2 below shows four (4) selectively absorbing nanoparticles 14 and the wavelength color that each color absorbs. Table 2 also shows two thin film interference pigment 12s and the wavelength color at normal (low) and high. Table 2 also shows the predicted reflected color of an article including the thin film interference pigment 12 and a coating 10 with selectively absorbing nanoparticles 14.

TABLE 2

| | Selectively Absorbing Nanoparticle | | | |
|---|---|---|---|---|
| | Cyan | Magenta | Yellow Absorbs | Green (discontinuous) |
| | Red | Green | Blue | Magenta (Blue and Red) |
| Green to Purple | Green Purple | Green Blue | Black Magenta | Green Red | Dark Green Black |
| Magenta to Green | Green Magenta | Blue Green | Magenta Black | Red Red | Black Green |

Figure 5:
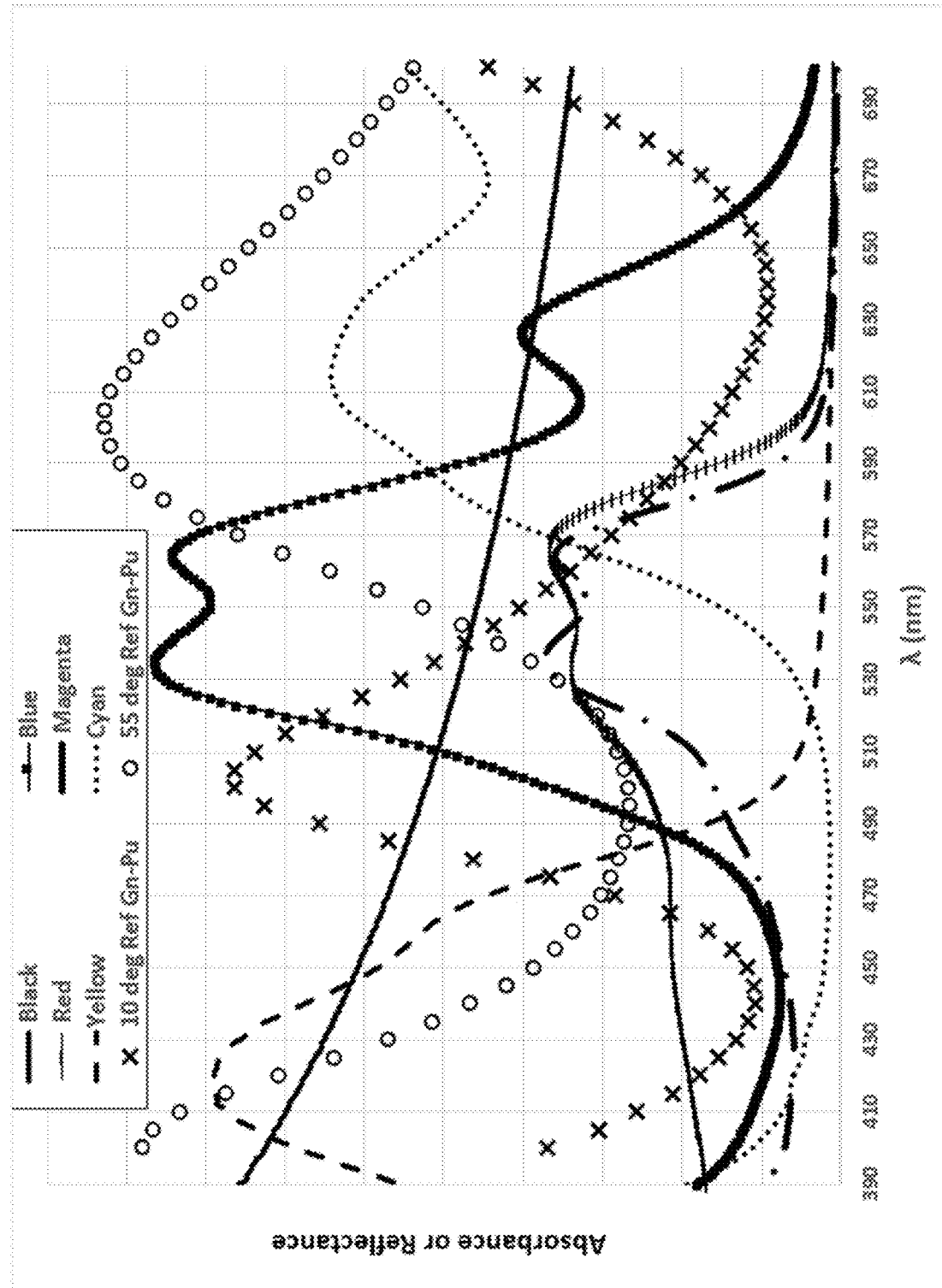
FIG. 5 illustrates a thin film interference pigment with a color travel from green to purple and the characteristic absorbance of various selectively absorbing nanoparticles.

FIG. 5 illustrates the color travel of the thin film interference pigment 12 that color shifted from green to purple. Because there were two reflectance peaks at high angle, it was possible to select the appropriate single selectively absorbing nanoparticle 14, such as a yellow pigment, or the appropriate blend of nanoparticles, in order to force the color travel in a reverse direction, such as from green to red. FIG. 5 also illustrates the absorption of several other selectively absorbing nanoparticles 14: cyan, yellow, magenta, red, blue, and black.

Figure 6:
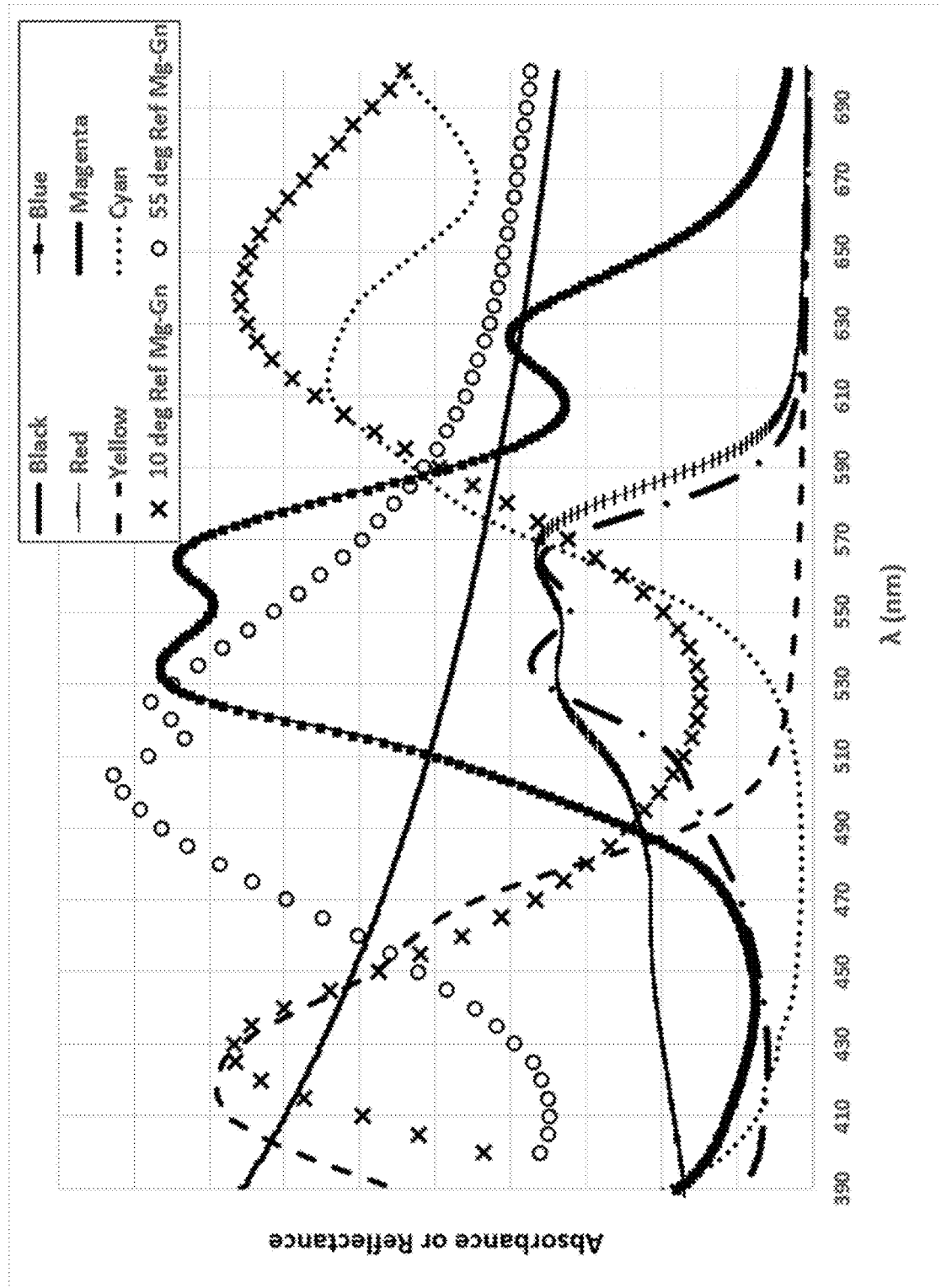
FIG. 6 illustrates a thin film interference pigment with a color travel from magenta to green and the characteristic absorbance of various selectively absorbing nanoparticles.

FIG. 6 illustrates the color travel of the thin film interference pigment 12 that color shifted from magenta to green, which is basically the reverse of the pigment illustrated in FIG. 5. So, now there were two reflectance peaks at normal. It was possible to select the appropriate selectively absorbing nanoparticle 14, such as a cyan pigment, or the appropriate blend of nanoparticles 14 in order to force the color travel in a reverse direction, such as from magenta (blue) to red.

The following examples illustrate that the article can exhibit a change of hue, lightness, and chroma as compared to the thin film interference pigment 12. For example, the article can exhibit a decrease in lightness and an increase in chroma or an increase in lightness and a decrease in chroma, as compared to the thin film interference pigment. Additionally, the color travel of the article can be different from a color travel of the thin film interference pigment 12.

Figure 7:
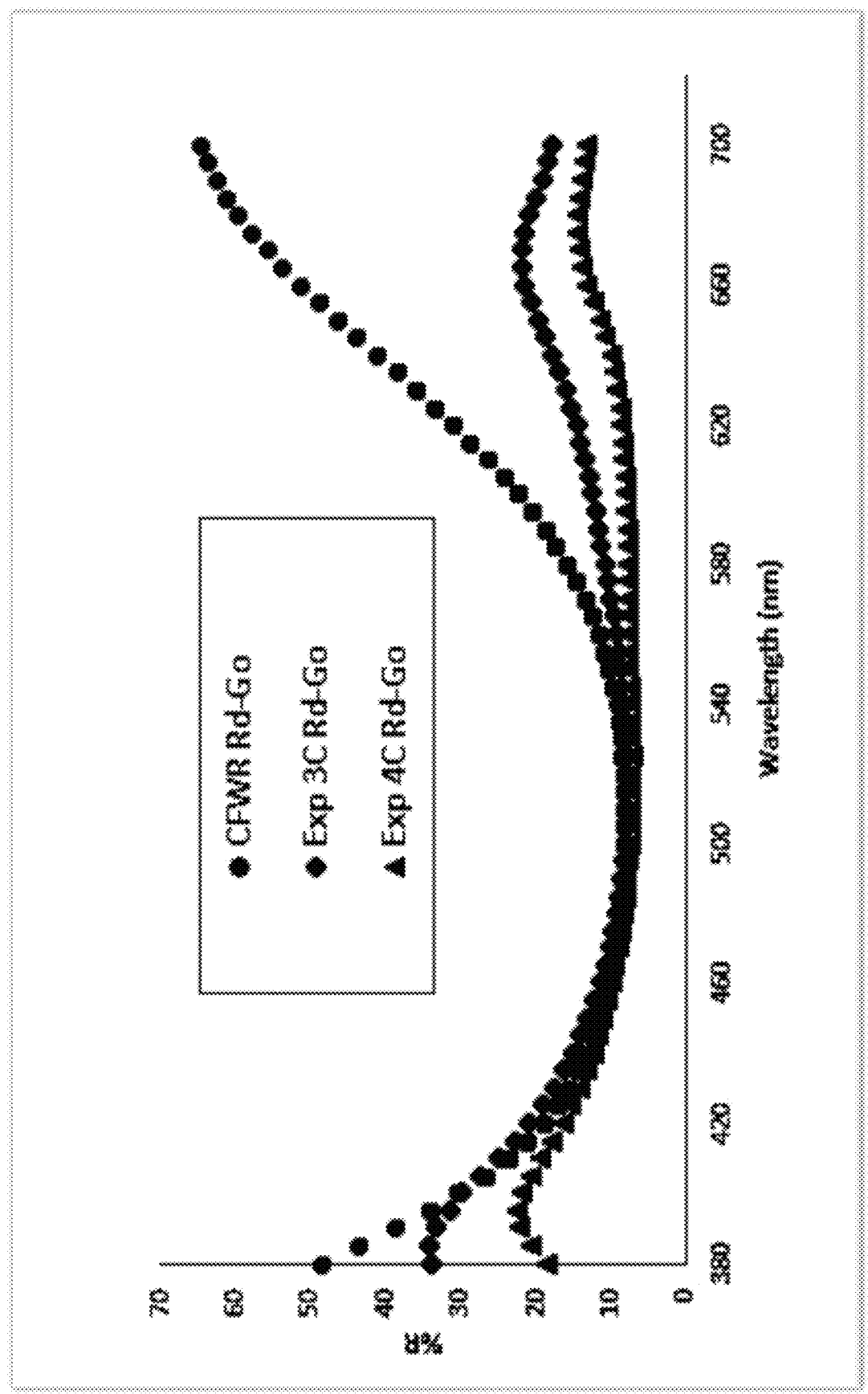
FIG. 7 illustrates the percent reflectance of a red to gold color shifting pigment alone, with three bi-layers of a cyan pigment (Exp 3C), and with four bi-layers of a cyan pigment (Exp 4C), under diffuse illumination.
Figure 8:
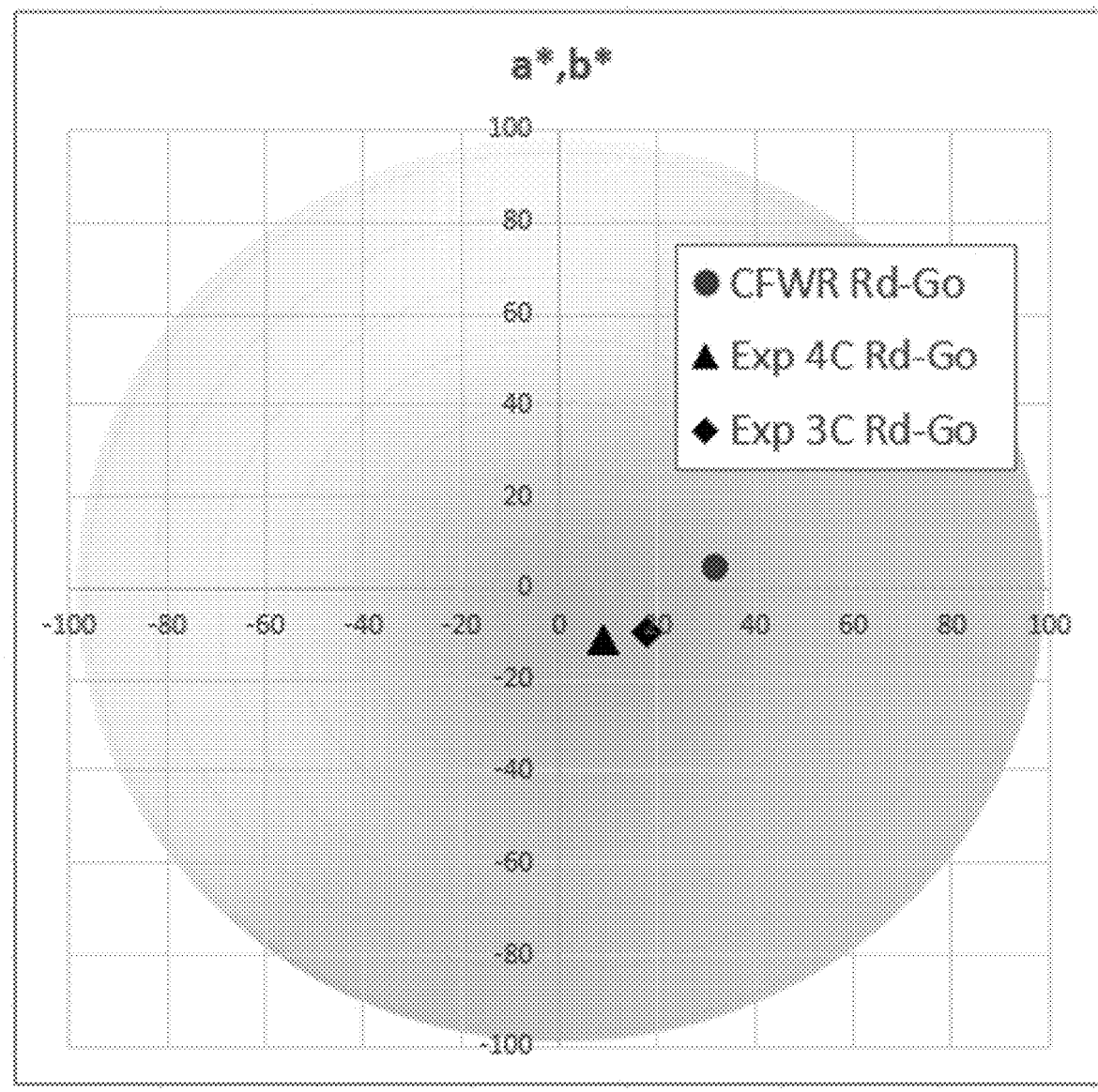
FIG. 8 illustrates the hue of the samples in FIG. 7 using an a*, b* graph, under diffuse illumination.
Figure 9:
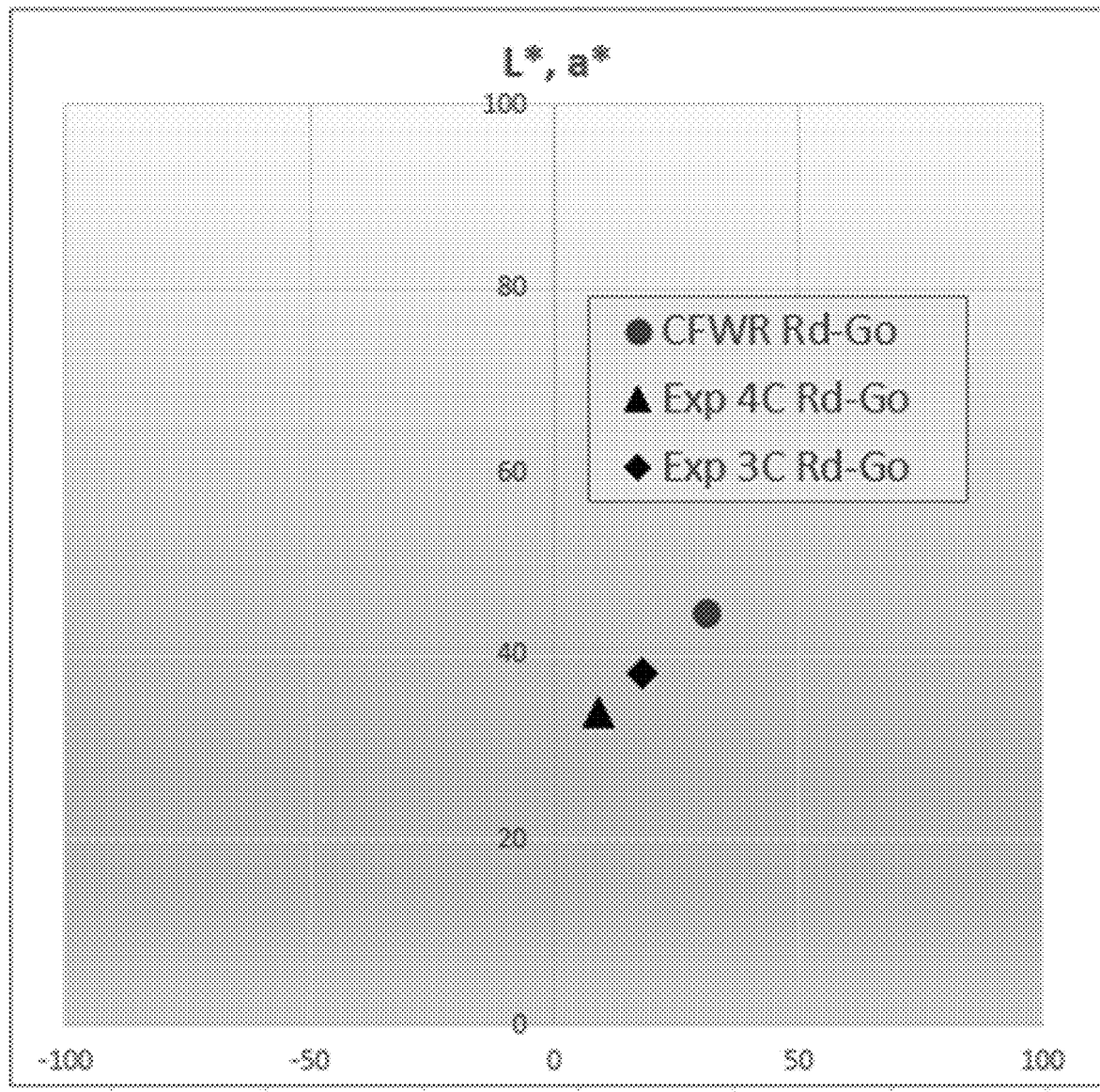
FIG. 9 illustrates the lightness of the samples in FIG. 7 using an L*a* graphs, under diffuse illumination.

Example 4—A red to gold thin film interference pigment 12 (CFWR) was coated with three bilayers of a cyan pigment (selectively absorbing nanoparticle) (EXP 3C), and four bilayers of a cyan pigment (selectively absorbing nanoparticle) (EXP 4C). Each of the coatings provided full coverage of the thin film interference pigment 12. The percent reflectance of the thin film interference pigment and the two articles is shown in FIG. 7. FIGS. 8 and 9 illustrate the hue and the lightness, respectively, for the thin film interference pigment 12 and the two articles. Table 3 below shows the Lightness (L*), a*, b*, chroma (c*), and hue.

TABLE 3

Optical Properties measured with DC650 Photospectrometer.

| Sample Name | Red to Gold Pigment Alone | Exp 3C | Exp 4C |
|---|---|---|---|
| L* | 44.43 | 38.07 | 33.75 |
| a* | 31.54 | 17.82 | 8.81 |
| b* | 4.96 | −9.70 | −11.07 |
| c* | 31.93 | 20.29 | 14.15 |
| h | 8.94 | 331.42 | 308.51 |

The data in FIGS. 7-9 and Table 3 shows that the red coloration of the thin film interference pigment 12 became more magenta with the addition of the coating 10 including a colored selectively absorbing nanoparticle (cyan pigment). The change in hue, as shown in FIG. 8, was accompanied by a decrease in lightness, as shown in FIG. 9.

Figure 10:
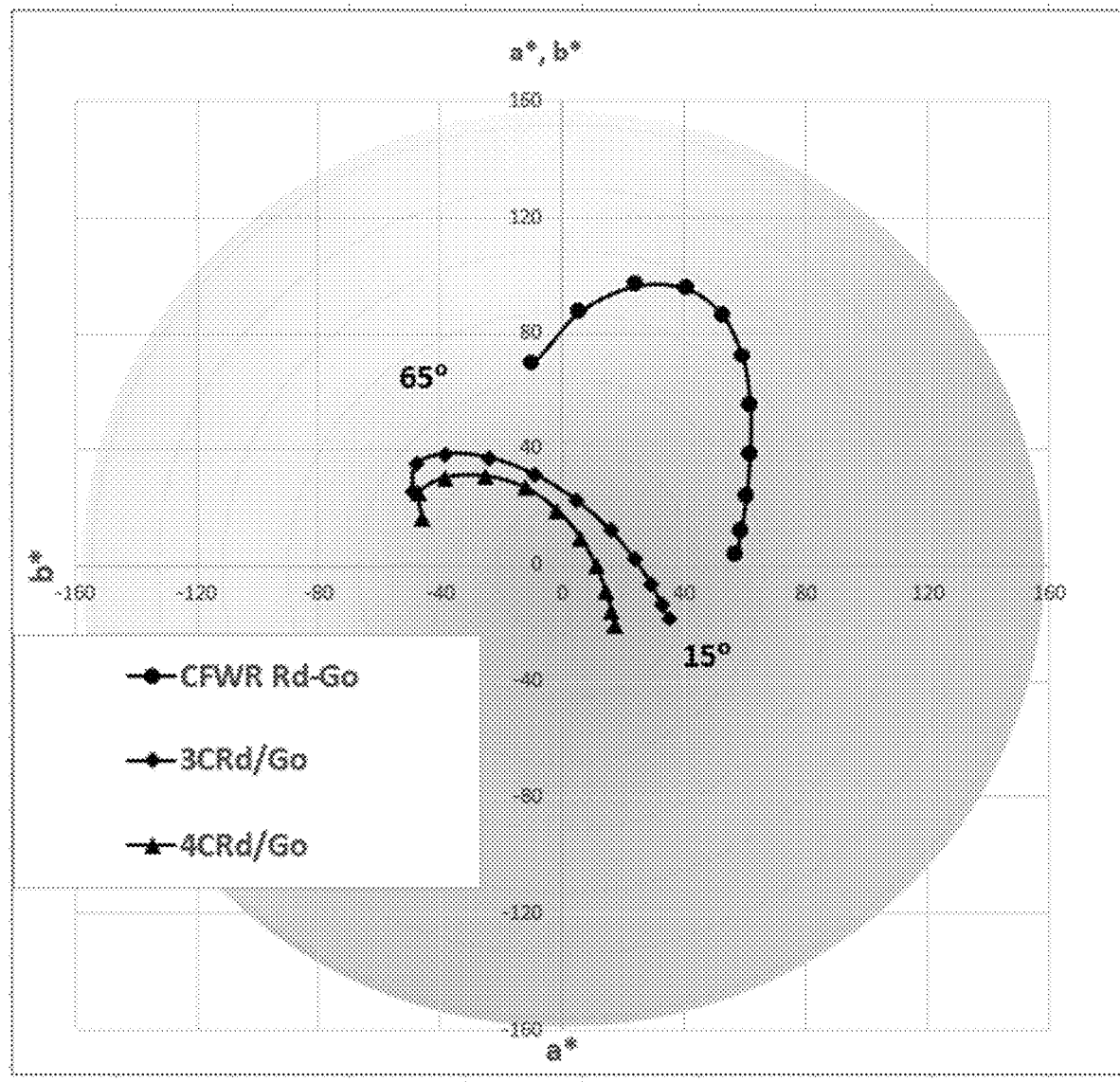
FIG. 10 illustrates the color travel of the samples in FIG. 7 from red to gold, or magenta to green (Exp 3C and Exp 4C), under direct illumination.
Figure 11:
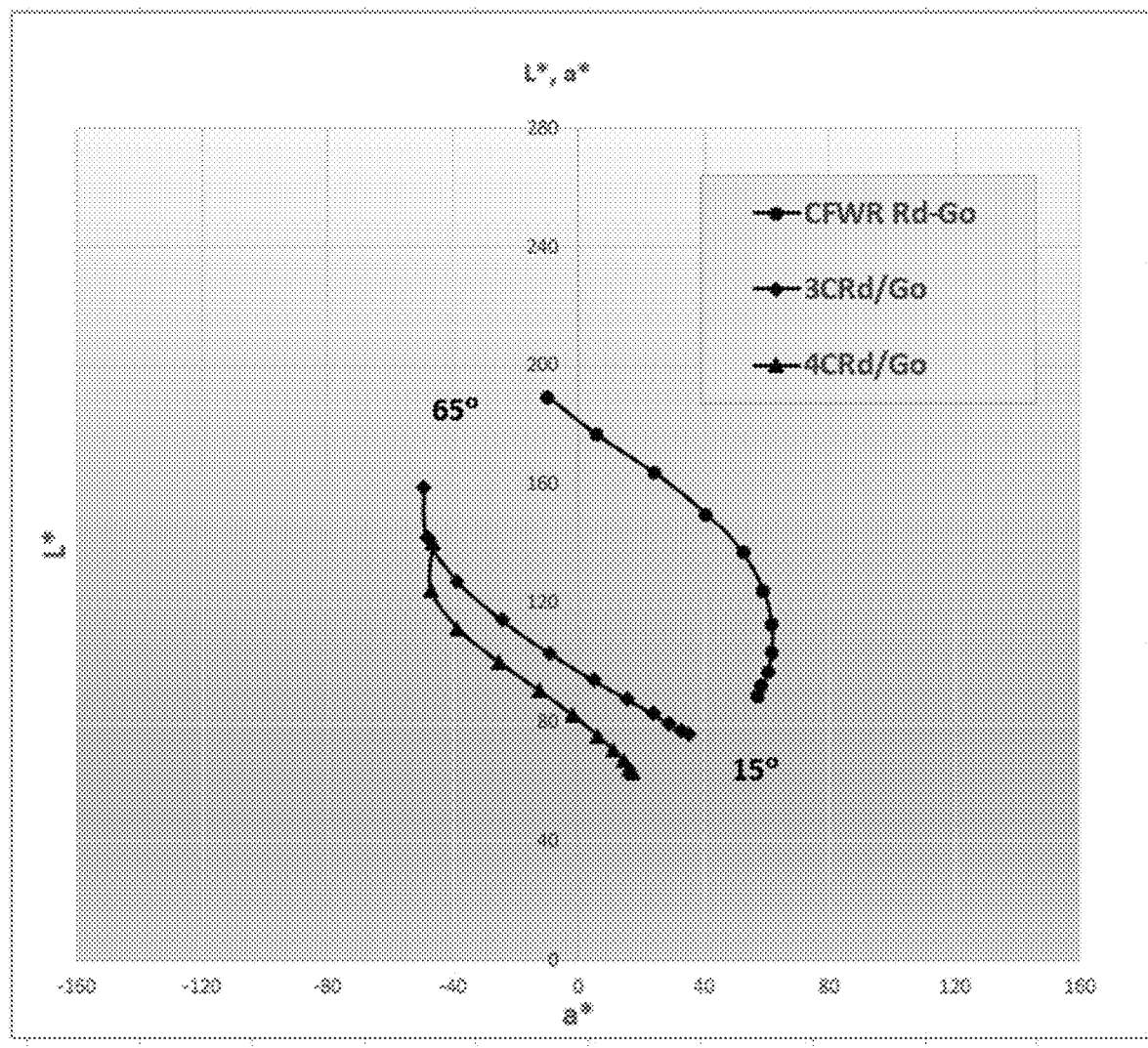
FIG. 11 illustrates the color travel of the lightness of the samples in FIG. 7 using an L*a* graphs, under direct illumination.

FIGS. 10 and 11 show the color travel of the thin film interference pigment 12 and the two articles, under direct illumination. FIG. 10 illustrates that the red to gold color travel of the thin film interference pigment 12 changed to a magenta to green hue with a coating 10 of three bilayers of a cyan pigment or a coating 10 with four bilayers of a cyan pigment. The lightness, as shown in FIG. 11, decreased with the addition of the coatings as compared to the thin film interference pigment alone. Additionally, the color close to normal (15 degrees) was more affected with the increase in the number of coatings (bilayers) as compared to the color at high angle (65 degrees).

Figure 12:
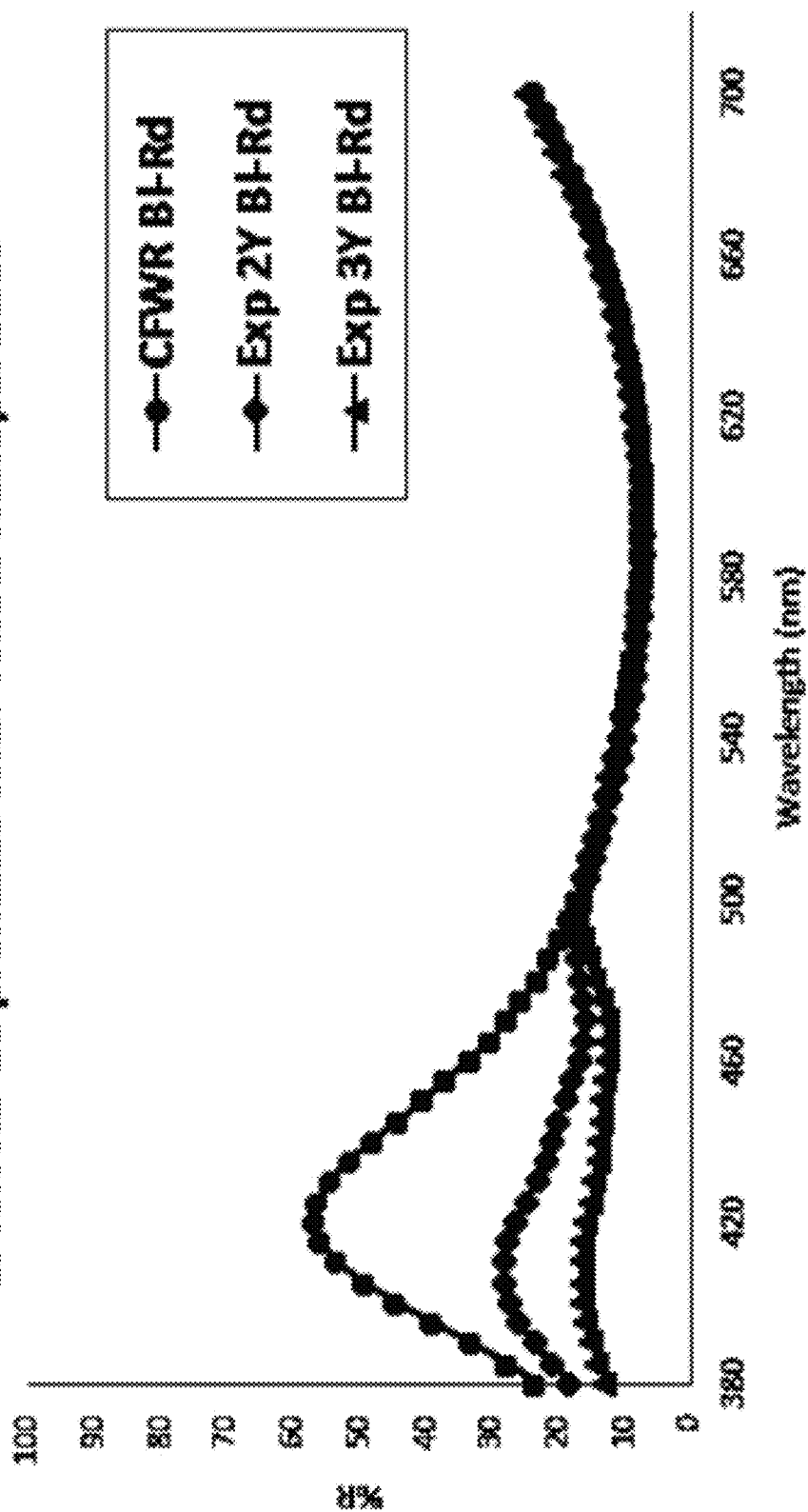
FIG. 12 illustrates the percent reflectance of a blue to red color shifting pigment alone, with two bi-layers of a yellow pigment (Exp 2Y), and with three bi-layers of a yellow pigment (Exp 3Y), under diffuse illumination.
Figure 13:
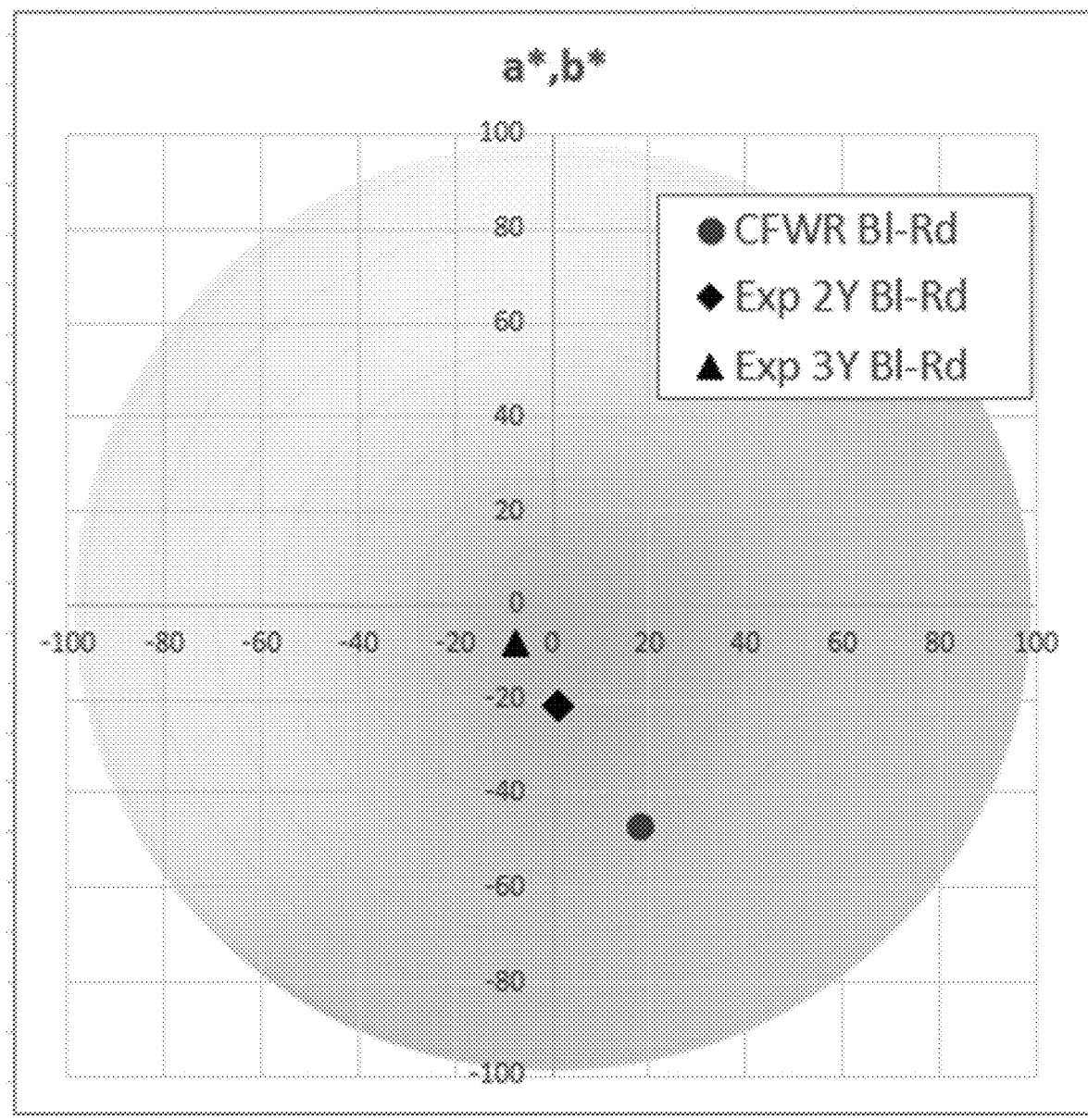
FIG. 13 illustrates the hue of the samples in FIG. 12 using an a*, b* graph, under diffuse illumination.
Figure 14:
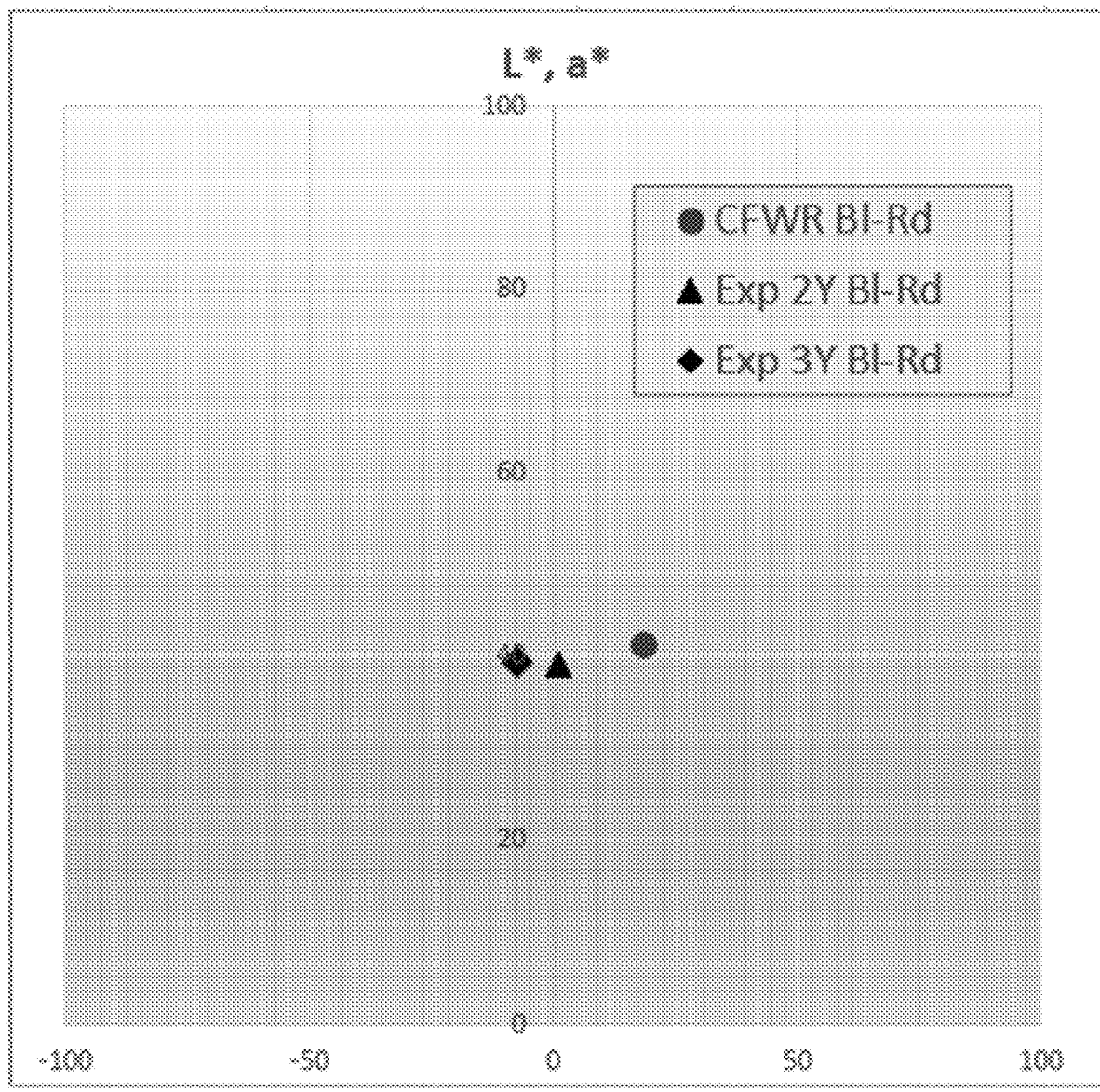
FIG. 14 illustrates the lightness of the samples in FIG. 12 using an L*a* graphs, under diffuse illumination.

Example 5—A blue to red thin film interference pigment 12 (CFWR) was coated with two bilayers of a yellow pigment (selectively absorbing nanoparticle) (EXP 2Y), and three bilayers of a yellow pigment (selectively absorbing nanoparticle) (EXP 3Y). Each of the coatings provided full coverage of the thin film interference pigment 12. The percent reflectance of the thin film interference pigment 12 and the two articles is shown in FIG. 12. FIGS. 13 and 14 illustrate the hue and the lightness, respectively, for the thin film interference pigment 12 and the two articles. Table 4 below shows the Lightness (L*), a*, b*, chroma (c*), and hue.

TABLE 4

Optical Properties measured with DC650 Photospectrometer.

| Sample Name | Blue to Red Pigment Alone | Exp 2Y | Exp 3Y |
|---|---|---|---|
| L* | 41.41 | 39.07 | 39.33 |
| a* | 18.36 | 1.01 | −7.70 |
| b* | −47.32 | −21.14 | −8.15 |
| c* | 50.76 | 21.16 | 11.21 |
| h | 291.21 | 272.72 | 226.62 |

The data in FIGS. 12-14 and Table 4 shows that the blue coloration of the thin film interference pigment 12 became more neutral blue with the addition of the coating including two bilayers of yellow pigment, and became more greenish with the addition of a coating 10 including three bilayers of yellow pigment. A decrease in hue, as shown in FIG. 13, was accompanied by a decrease in lightness, as shown in FIG. 14.

Figure 15:
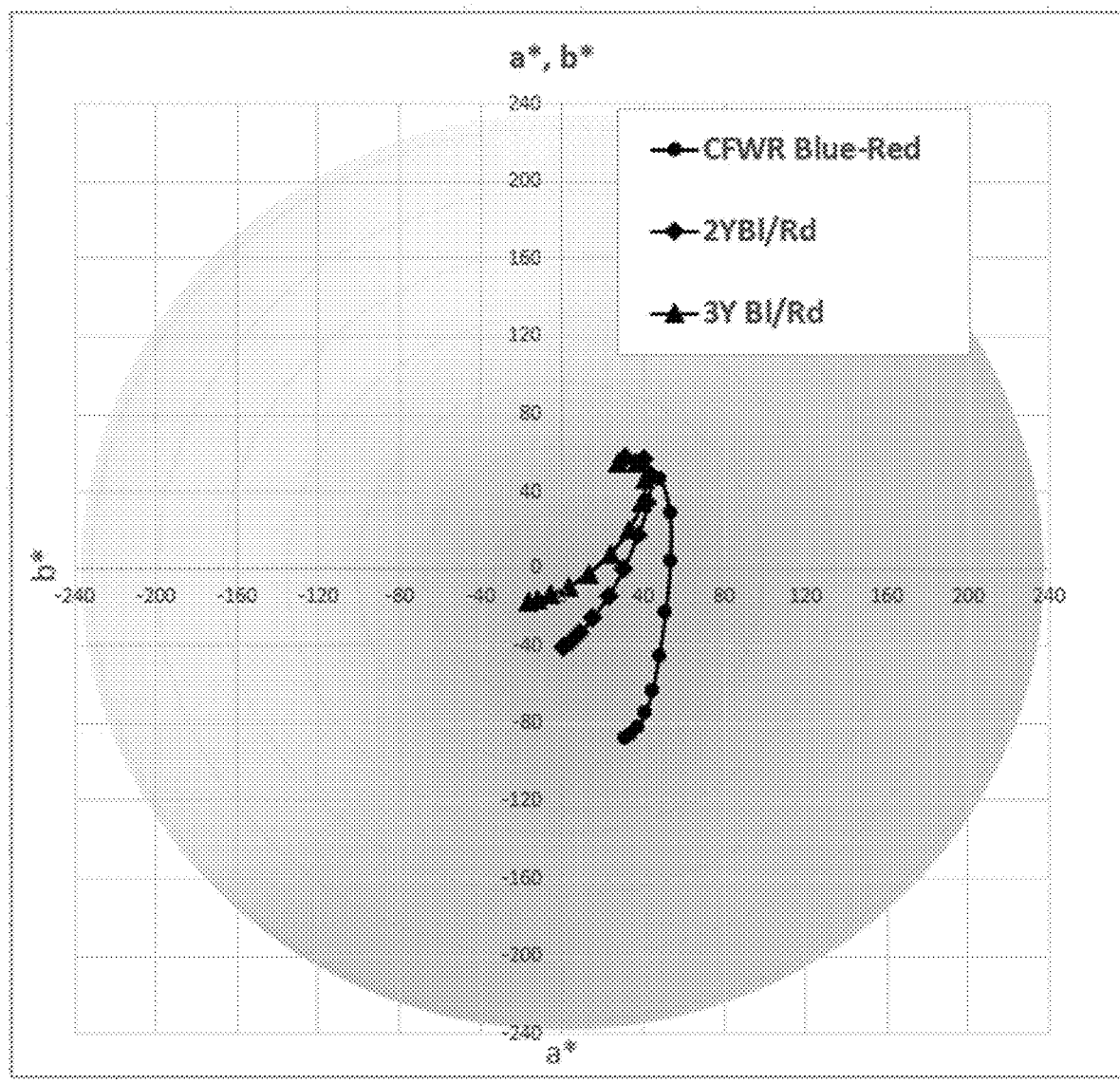
FIG. 15 illustrates the color travel of the samples in FIG. 12 from blue to red, or green to orange (Exp 2Y and Exp 3Y), under direct illumination.
Figure 16:
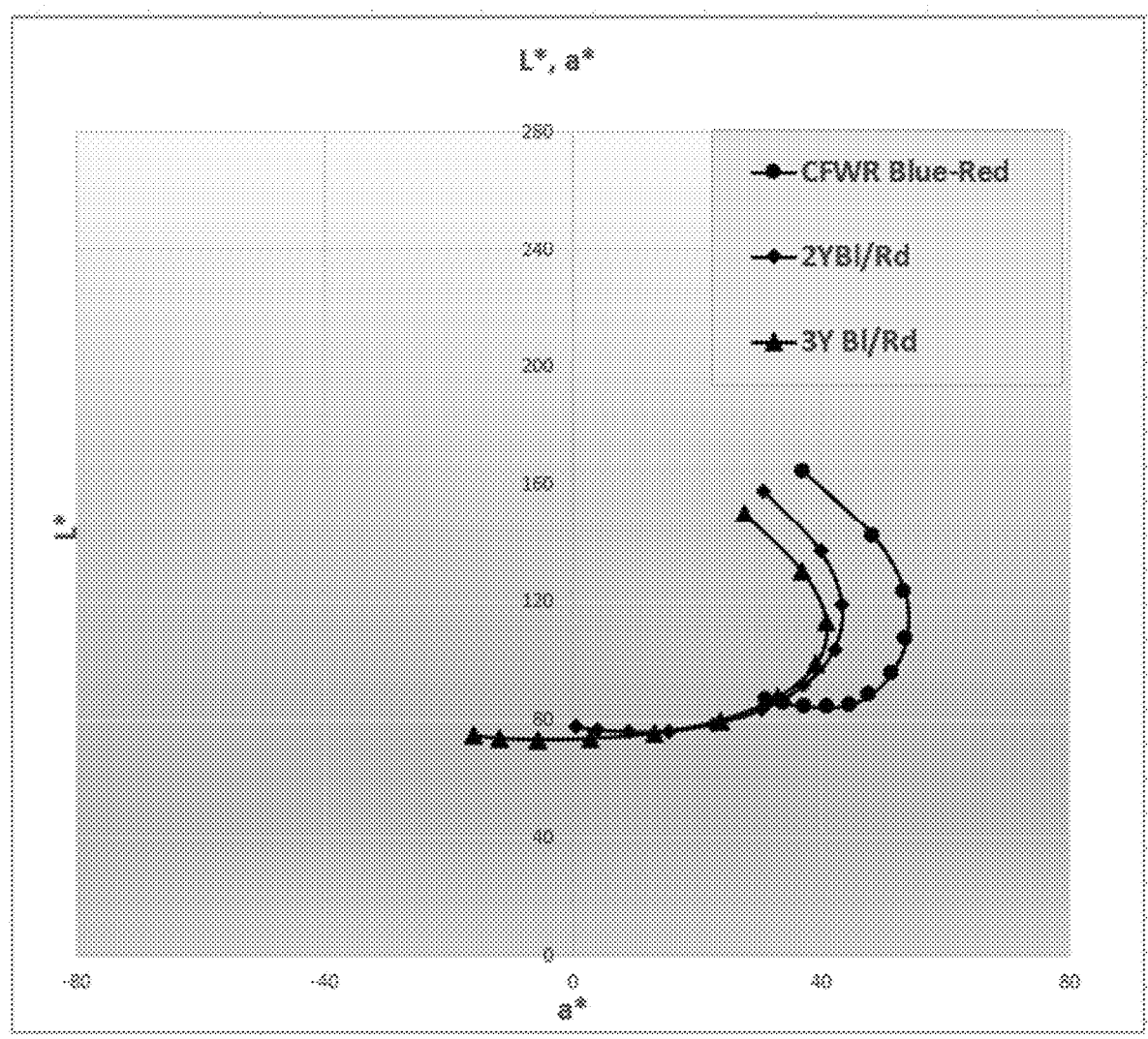
FIG. 16 illustrates the color travel of the lightness of the samples in FIG. 12 using an L*a* graphs, under direct illumination.

FIGS. 15 and 16 show the color travel of the thin film interference pigment 12 and the two articles, under direct illumination. FIG. 15 illustrates that the blue to red color travel of the thin film interference pigment 12 changed to become more neutral with a coating 10 of two bilayers of a yellow pigment or darker blue or green to orange with a coating 10 with three bilayers of a yellow pigment. The color at high angle (65 degrees) did not change as much with the number of coating 10 of a bilayer. As shown in FIG. 16, the lightness decreased with the addition of the coating 10 of colored selectively absorbing nanoparticles. The color close to normal (15 degrees) was more affected with the addition of the coatings as compared to the color at high angle (65 degrees).

Figure 17:
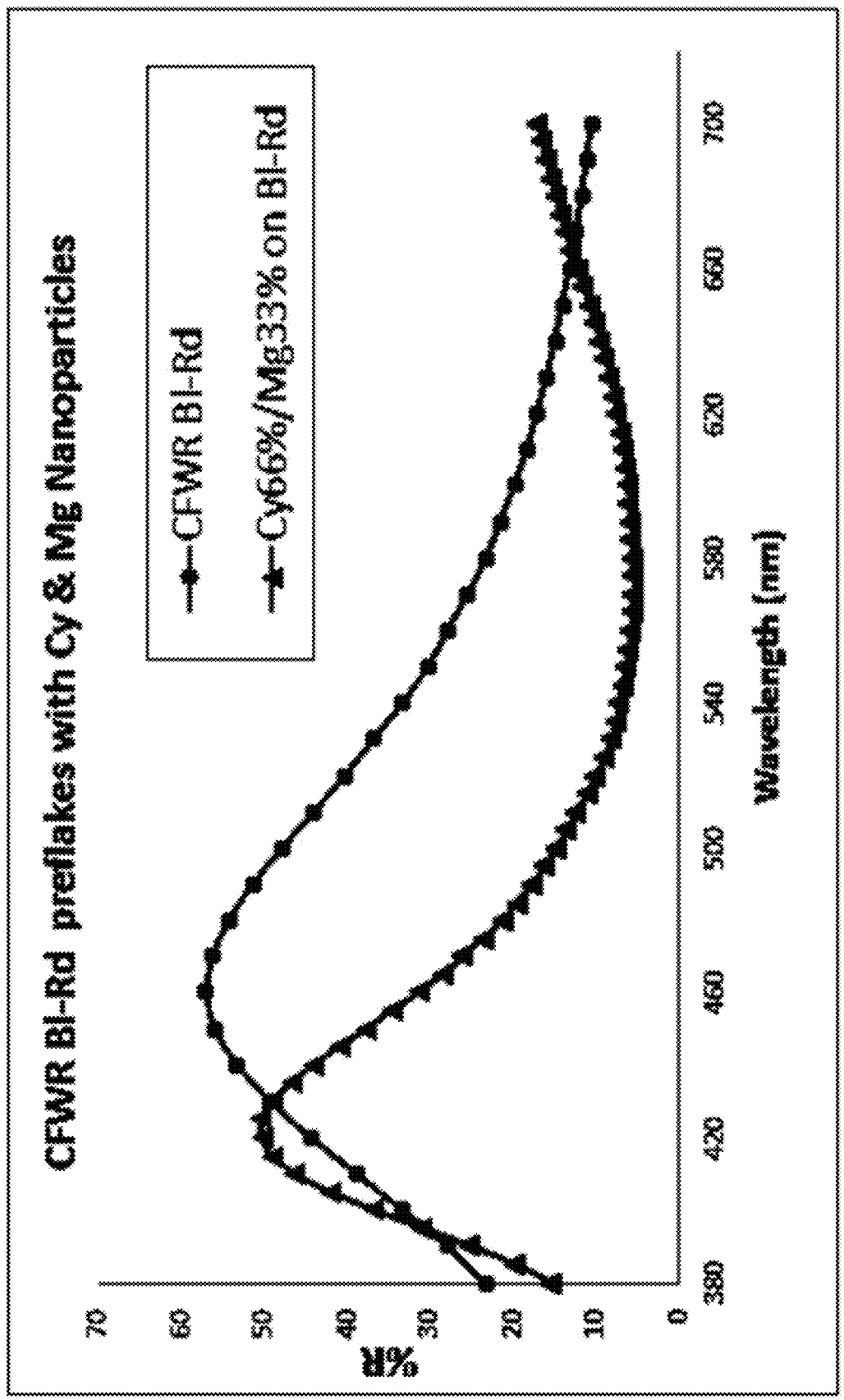
FIG. 17 illustrates the percent reflectance of the blue to red color shifting pigment alone, with a blend including cyan and magenta nanoparticles, under diffuse illumination.
Figure 18:
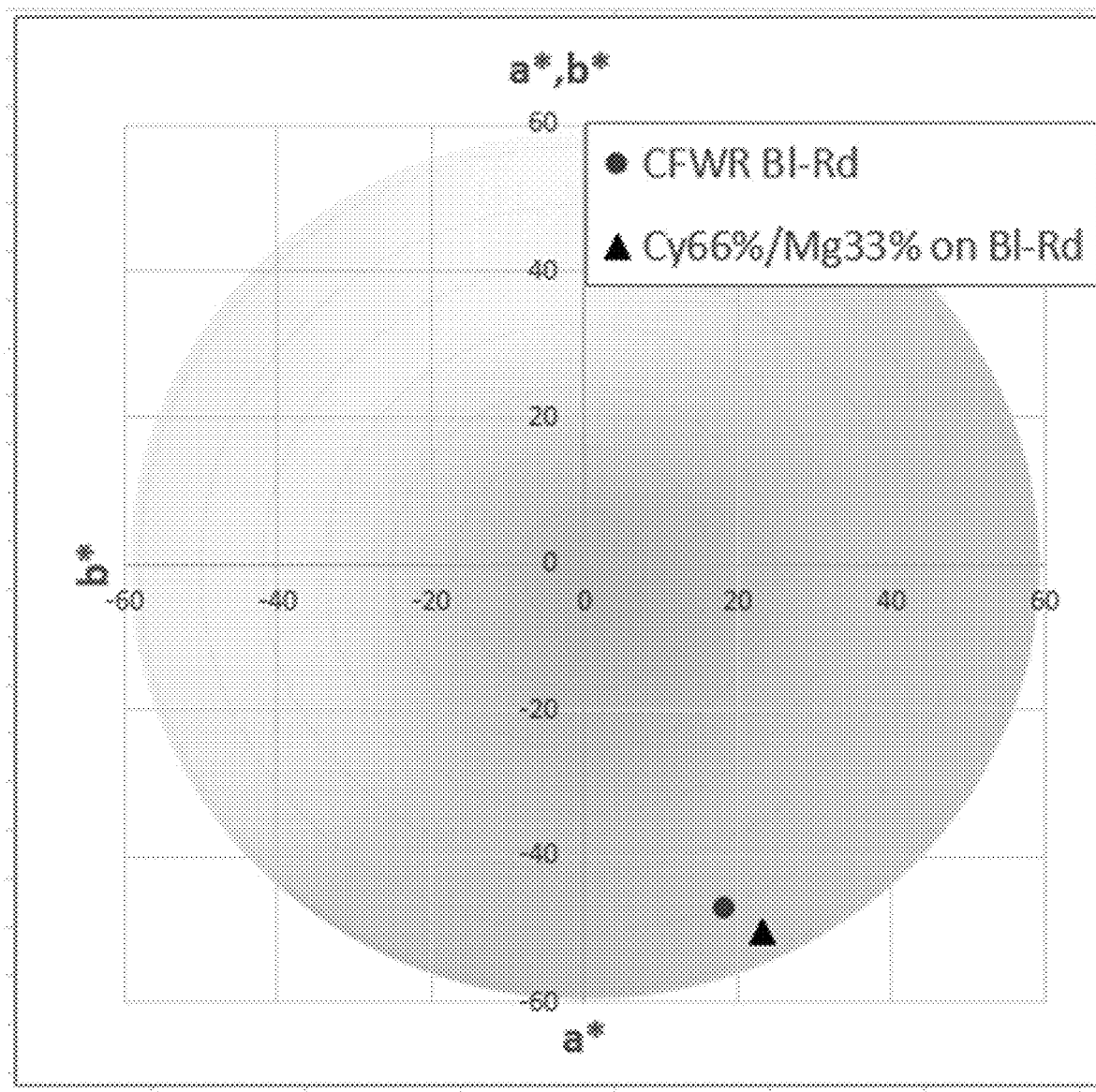
FIG. 18 illustrates the hue of the samples in FIG. 17 using an a*, b* graph, under diffuse illumination.
Figure 19:
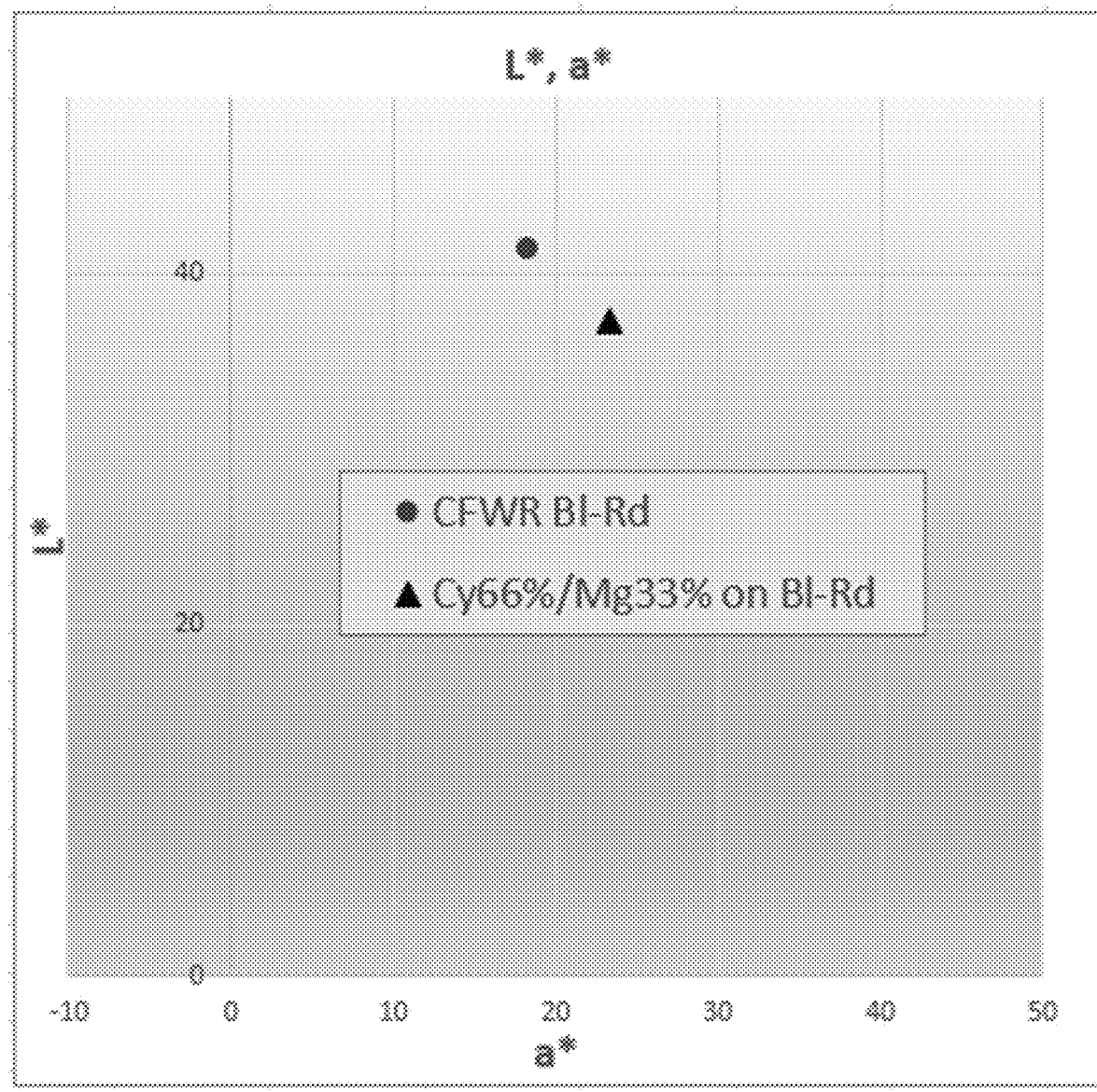
FIG. 19 illustrates the lightness of the samples in FIG. 17 using an L*a* graphs, under diffuse illumination.

Example 6—A blue to red thin film interference pigment 12 (CFWR) was coated with three bilayers of a blend of cyan and magenta selectively absorbing nanoparticles. Each bilayer of the blend included 66% by weight of cyan pigment and 33% by weight of magenta pigment. The percent reflectance of the thin film interference pigment 12 and the blend is shown in FIG. 17. FIGS. 18 and 19 illustrate the hue and the lightness, respectively, for the thin film interference pigment 12 and the article with the coating 10 blend. Table 5 below shows the Lightness (L*), a*, b*, chroma (c*), and hue.

TABLE 5

Optical Properties measured with DC650 Photospectrometer.

| Sample Name | Blue to Red Pigment Alone | 3BL Cyan 66%/Magenta 33% |
|---|---|---|
| L* | 41.41 | 37.34 |
| a* | 18.36 | 23.28 |
| b* | −47.32 | −50.23 |
| c* | 50.76 | 55.36 |
| h | 291.21 | 294.87 |

The data in FIGS. 17-19 and Table 5 shows that the original blue/magenta coloration of the thin film interference pigment 12 was not very affected by the coating 10. In particular, the hue only changed minimally, as shown in FIG.

18 and Table 5. There was a slight decrease in lightness, as shown in FIG. 19, and an increase in chroma, as shown in Table 5.

Figure 20:
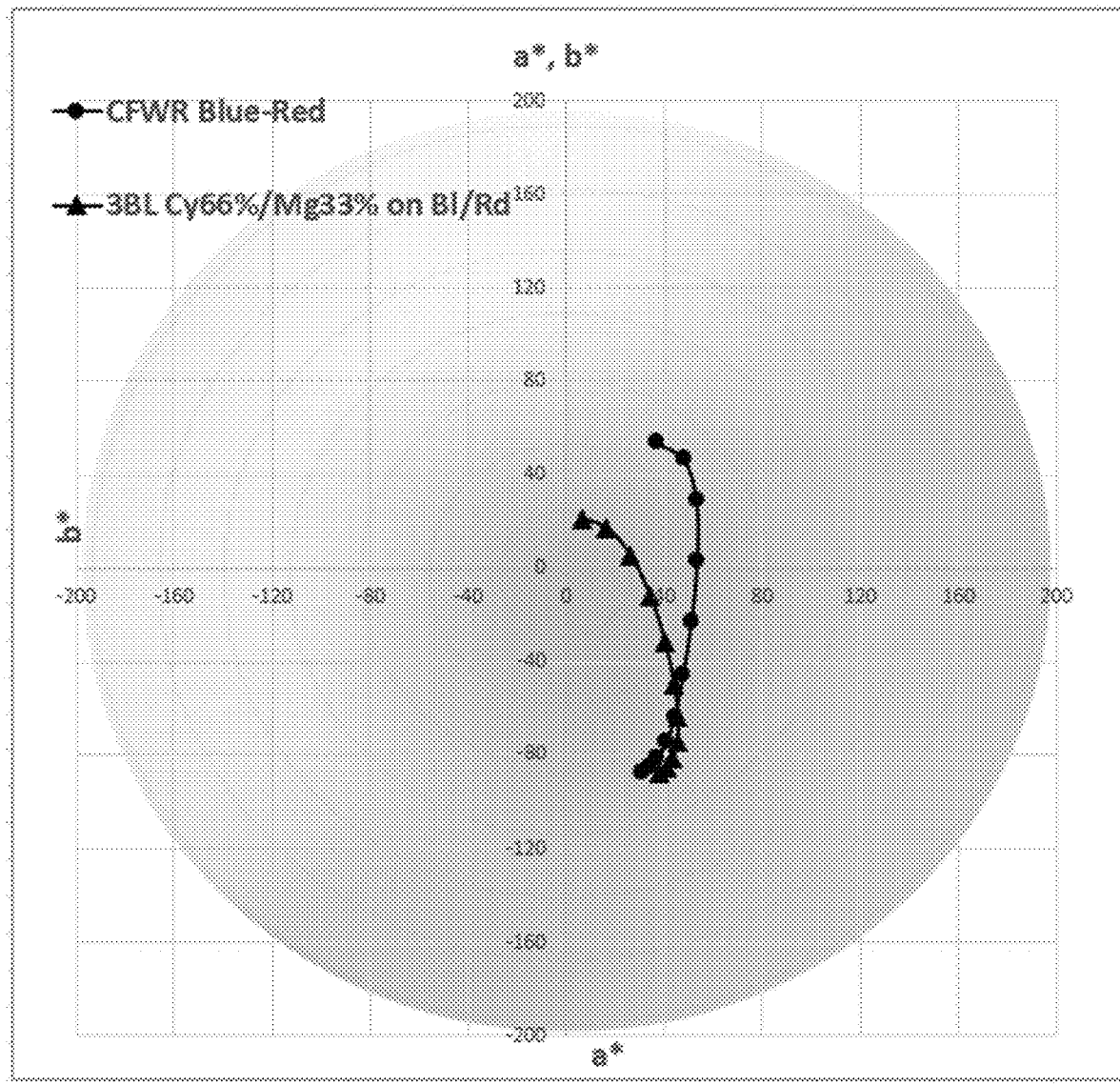
FIG. 20 illustrates the color travel of the samples in FIG. 17, under direct illumination.
Figure 21:
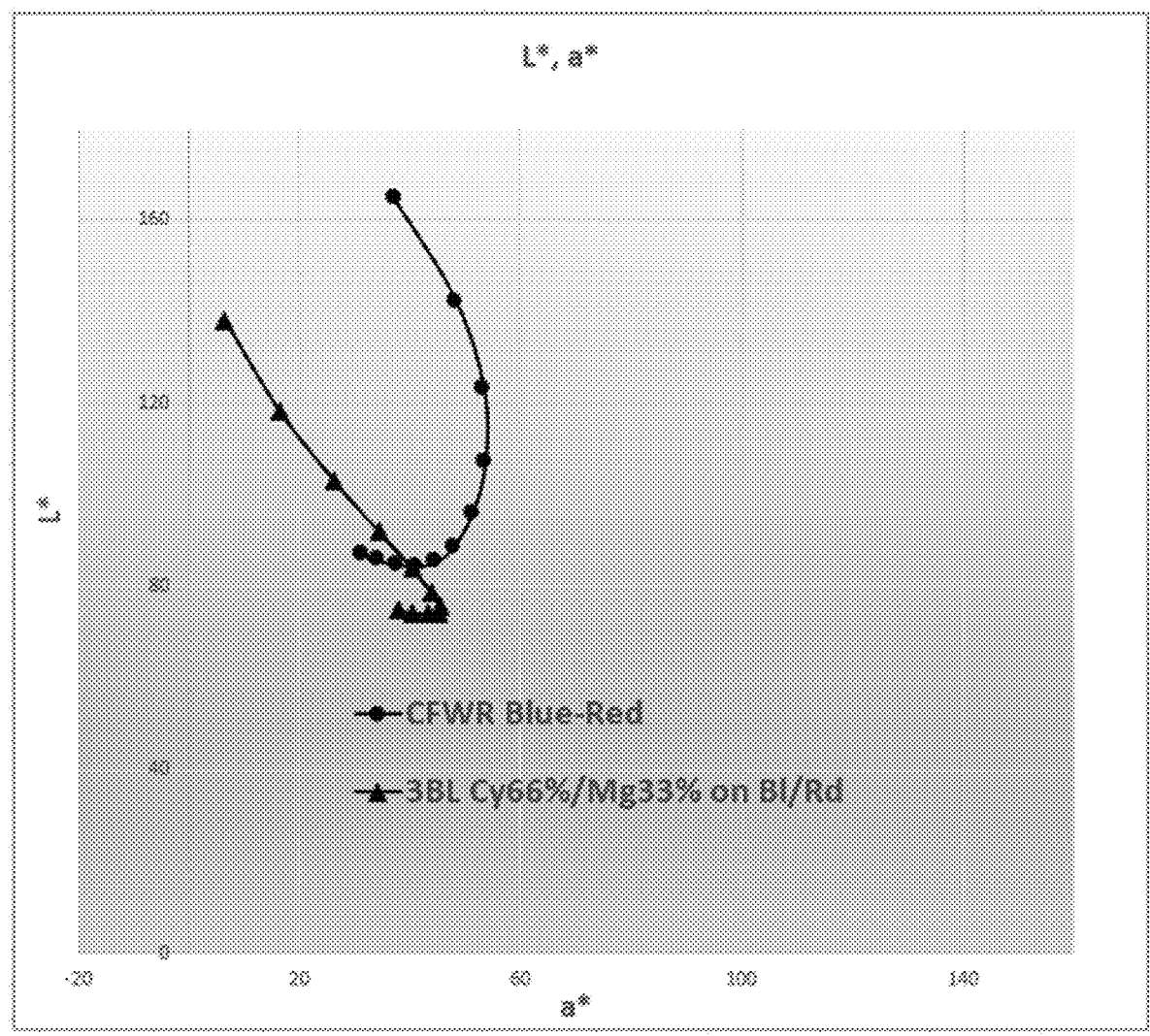
FIG. 21 illustrates the color travel of the lightness of the samples in FIG. 17 using an L*a* graph, under direct illumination.

FIGS. 20 and 21 show the color travel of the thin film interference pigment 12 and the article, under direct illumination. FIG. 20 illustrates that the blue to red color travel of the thin film interference pigment 12 was not very affected by the coating 10 at close to normal (15 degrees). The color at high angle (65 degrees) showed a larger change at high angle (65 degrees). As shown in FIG. 21, the article with the coating 10 of the blend was darker as compared to the thin film interference pigment 12 alone. FIGS. 20 and 15 clearly illustrate how the selection of the selectively absorbing nanoparticles 14 and the thin film interference pigments 12, such as a color shifting pre-flake, can affect the color at normal or at high angles for an article. The color close to normal and at high angle is different in the article as compared to the thin film interference pigment 12.

Example 7—FIG. 22 illustrates an article including a thin film interference pigment 12 and a coating 10 including a colored selectively absorbing nanoparticle 14. The coating 10 is multiple layers including two or more layers, in which each layer has a colored selectively absorbing nanoparticle 14. A layer 22 has a cyan pigment as the colored selectively absorbing nanoparticle 14. A layer 24 has a yellow pigment as the colored selectively absorbing nanoparticle 14. Incident light ray 16 was received by the article and reflected light 18 and transmitted light 20. The reflected light 18 was same color as the last applied layer in the coating 10, which in this example was cyan. The transmitted light 20 was magenta. The order of the two or more layers changed the color in reflection and maintained the color in transmission.

Example 8—FIG. 23 illustrates an article including a thin film interference pigment 12 and a coating 10 including a blend of two or more different colored selectively absorbing nanoparticles 14. In this example, the blend has a cyan pigment and a yellow pigment as the colored selectively absorbing nanoparticle 14. Incident light ray 16 was received by the article and reflected light 18 and transmitted light 20. The reflected light 18 was a blend of the nanoparticles, cyan and yellow, and in this case, the reflected light 18 was green. The transmitted light 20 was magenta.

By comparison, a standard semi-transparent special effect pigment (e.g., all dielectric pigments, dichroic pigments, or pearlescent pigments) will transmit a color that was complementary to a reflected color. For example, a standard semi-transparent special effect pigment reflects red and transmits green. The article disclosed herein can be designed to exhibit a different reflected/transmitted color that is other than a complementary color.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the coatings, devices, activities and mechanical actions disclosed herein. For each coating, device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a coating can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An article, comprising:
a thin film interference pigment; and
a coating including two or more different colored selectively absorbing nanoparticles on the thin film interference pigment, wherein the two or more different colored selectively absorbing nanoparticles are each chosen from an organic pigment, a dye, a metal oxide, a metal carbide, a metal sulfide, and combinations thereof;
wherein the two or more different colored selectively absorbing nanoparticles of the coating on the thin film interference pigment cause, at different viewing angles, a color shift of the thin film interference pigment so that the color shift of the article is from a low to high wavelength.

2. The article of claim 1, wherein the coating is a layer including a blend of the two or more different colored selectively absorbing nanoparticles.

3. The article of claim 2, wherein the blend is equal portions, by weight, of each of the two or more different colored selectively absorbing nanoparticles.

4. The article of claim 2, wherein the blend is different portions, by weight, of each of the two or more different colored selectively absorbing nanoparticles.

5. The article of claim 1, wherein the coating is multiple layers in which each layer includes a blend of two or more different colored selectively absorbing nanoparticles.

6. The article of claim 1, wherein the coating is multiple layers including two or more layers in which each layer has a colored selectively absorbing nanoparticle.

7. The article of claim 6, wherein the multiple layers include two or more layers of a first color of selectively absorbing nanoparticles, and two or more layers of a second color of selectively absorbing nanoparticles, wherein the first color is different from the second color.

8. The article of claim 7, wherein an order of the two or more layers changes a color in reflection and maintains a color in transmission.

9. The article of claim 6, wherein the two or more layers of colored selectively absorbing nanoparticles include a first layer with a first portion of colored selectively absorbing nanoparticles, and a second layer with a second portion of colored selectively absorbing nanoparticles.

10. The article of claim 1, wherein the coating is continuous.

11. The article of claim 1, wherein the coating of selectively absorbing nanoparticles is discontinuous.

12. A method of making an article, comprising:
providing a thin film interference pigment; and
coating the thin film interference pigment with two or more different colored selectively absorbing nanoparticles, wherein the two or more different colored selectively absorbing nanoparticles are nanoparticles chosen from an organic pigment, a dye, a metal oxide, a metal carbide, a metal sulfide, and combinations thereof;

wherein the two or more different colored selectively absorbing nanoparticles of the coating on the thin film interference pigment cause, at different viewing angles, a color shift of the thin film interference pigment so that the color shift of the article is from a low to high wavelength.

13. The method of claim 12, wherein the coating fully encapsulates the thin film interference pigment.

14. The method of claim 12, wherein the coating encapsulates a portion of the thin film interference pigment.

15. The method of claim 12, wherein a color travel of the article is different from a color travel of the thin film interference pigment, wherein the color travel is based on reflected color as a viewing angle changes.

16. The method of claim 12, wherein the coating is a layer including a blend of the two or more different colored selectively absorbing nanoparticles.

17. The method of claim 16, wherein the article exhibits a change of hue, a decrease in lightness, and an increase in chroma as compared to the thin film interference pigment; or wherein the article exhibits a change of hue and an increase in lightness and a decrease in chroma as compared to the thin film interference pigment.

18. The method of claim 12, wherein the coating is multiple layers including two or more layers of colored selectively absorbing nanoparticles.

19. An article, comprising:
a thin film interference foil; and
a coating including two or more different colored selectively absorbing nanoparticles on the thin film interference foil, wherein the two or more different colored selectively absorbing nanoparticles are each chosen from an organic pigment, a dye, a metal oxide, a metal carbide, a metal sulfide, and combinations thereof;

wherein the two or more different colored selectively absorbing nanoparticles of the coating on the thin film interference foil cause, at different viewing angles, a color shift of the thin film interference foil so that the color shift of the article is from a low to high wavelength.

* * * * *